United States Patent
Kung et al.

(10) Patent No.: US 10,931,406 B2
(45) Date of Patent: Feb. 23, 2021

(54) METHOD AND APPARATUS FOR HANDLING FEEDBACK RESOURCE FOR GROUPCAST IN SIDELINK IN A WIRELESS COMMUNICATION SYSTEM

(71) Applicant: ASUSTek Computer Inc., Taipei (TW)

(72) Inventors: Yi-Hsuan Kung, Taipei (TW); Li-Chih Tseng, Taipei (TW); Li-Te Pan, Taipei (TW); Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/892,850

(22) Filed: Jun. 4, 2020

(65) Prior Publication Data

US 2020/0389257 A1 Dec. 10, 2020

Related U.S. Application Data

(60) Provisional application No. 62/859,308, filed on Jun. 10, 2019.

(51) Int. Cl.
*H04L 1/18* (2006.01)
*H04W 4/40* (2018.01)
(Continued)

(52) U.S. Cl.
CPC .......... *H04L 1/1812* (2013.01); *H04B 17/24* (2015.01); *H04W 4/06* (2013.01); *H04W 4/40* (2018.02); *H04W 8/26* (2013.01); *H04W 72/0406* (2013.01); *H04W 76/14* (2018.02); *H04W 76/15* (2018.02)

(58) Field of Classification Search
CPC ....... H04L 1/0001; H04L 1/1812; H04L 1/18; H04W 4/06; H04W 4/40; H04W 76/14; H04W 76/16; H04W 4/46; H04W 8/08
See application file for complete search history.

(56) References Cited

U.S. PATENT DOCUMENTS

| 2019/0014564 | A1* | 1/2019 | Lee .......................... H04W 4/40 |
| 2020/0113015 | A1* | 4/2020 | Basu Mallick ....... H04W 48/18 |
| 2020/0145867 | A1* | 5/2020 | Tseng .................... H04L 1/0001 |

OTHER PUBLICATIONS

Husain et al., An overview of standardization efforts for enabling vehicular to everything services, IEEE, pp. 109 to 114. (Year: 2017).*

(Continued)

*Primary Examiner* — Shelly A Chase
(74) *Attorney, Agent, or Firm* — Skaar Ulbrich Macari, P.A.

(57) ABSTRACT

A method and apparatus are disclosed from the perspective of a first device to determine sidelink feedback resource associated with sidelink communication. In one embodiment, the method includes the first device receiving an identifier from an upper layer of the first device. The method also includes the first device receiving a sidelink transmission from a second device. The method further includes the first device determining a sidelink feedback resource associated with the sidelink transmission at least based on the identifier and a source ID (Identity) associated with the sidelink transmission. In addition, the method includes the first device using the sidelink feedback resource to transmit a feedback in response to the sidelink transmission to the second device.

18 Claims, 19 Drawing Sheets

(51) Int. Cl.
  *H04W 76/15*   (2018.01)
  *H04W 76/14*   (2018.01)
  *H04W 4/06*    (2009.01)
  *H04W 72/04*   (2009.01)
  *H04W 8/26*    (2009.01)
  *H04B 17/24*   (2015.01)

(56) References Cited

OTHER PUBLICATIONS

Campolo et al., 5G Network slicing for vehicle to everything services, IEEE, pp. 38 to 46 (Year: 2017).*

Yoon et al., A modified primary sidelink synchronization signal for vehicular to vehicular communication, IEEE, pp. 450-452. (Year: 2017).*

LG Electronics Inc., "Support of HARQ Feedback Options for Groupcast", 3GPP TSG-RAN WG2 #106 R2-1907205, Reno, USA, May 13-17, 2019.

European Search Report in corresponding EP Application No. 20178148.1, dated Oct. 12, 2020.

Interdigital et al.: "On Physical Layer Procedure for NR V2X Sidelink", 3GPP Draft, R1-1907096, 3rd Generation Partnership Project (3GPP), Mobile Competence Centre; 650, Route Des Lucioles; F-06921 Sophia-Antipolis, May 3, 2019, XP051709125.

Lenovo et al.: "Support of unicast, groupcast and broadcast in NR V2X", 3GPP Draft, R1-1810573, 3rd Generation Partnership Project (3GPP), Mobile Competence Centre; F-06921 Sophia-Antipolis Cedex, France,, Sep. 28, 2018, XP051517980.

Qualcomm Incorporated: "Physical layer procedures for sidelink", 3GPP Draft; R1-1907274, Physical Layer Procedures for Sidelink, 3rd Generation Partnership Project (3GPP), Mobile Competence Centre; 650, Route Des Cucioles; F-06921 Sophia-Antipolis Cedex, France, May 4, 2019, XP051709297.

Oppo: "Physical layer procedure for NR-V2X sidelink", 3GPP Draft, R1-1906475, Phy Layer Procedure, 3rd Generation Partnership Project (3GPP), Mobile Competence Centre; 650, Route Des Lucioles; F-06921 Sophia-Antipolis Cedex, France, May 13, 2019, XP051727925.

* cited by examiner

Leader UE Message:
UEID_1 identifier 1
UEID_2 identifier 2
UEID_3 identifier 3

FIG. 13

| Rx UE | Tx UE | identifier |
|---|---|---|
| UE1 | UE2 | Identifier1 |
|  | UE3 | Identifier2 |
| UE2 | UE1 | Identifier3 |
|  | UE3 | Identifier4 |
| UE3 | UE1 | Identifier5 |
|  | UE2 | Identifier6 |

FIG. 14A

| Tx UE | Rx UE | identifier |
|---|---|---|
| UE1 | UE2 | Identifier1 |
|  | UE3 | Identifier2 |
| UE2 | UE1 | Identifier3 |
|  | UE3 | Identifier4 |
| UE3 | UE1 | Identifier5 |
|  | UE2 | Identifier6 |

FIG. 14B

METHOD AND APPARATUS FOR HANDLING FEEDBACK RESOURCE FOR GROUPCAST IN SIDELINK IN A WIRELESS COMMUNICATION SYSTEM

CROSS-REFERENCE TO RELATED APPLICATIONS

The present Application claims the benefit of U.S. Provisional Patent Application Ser. No. 62/859,308 filed on Jun. 10, 2019, the entire disclosure of which is incorporated herein in its entirety by reference.

FIELD

This disclosure generally relates to wireless communication networks, and more particularly, to a method and apparatus for handling feedback resource for groupcast in sidelink in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device to determine sidelink feedback resource associated with sidelink communication. In one embodiment, the method includes the first device receiving an identifier from an upper layer of the first device. The method also includes the first device receiving a sidelink transmission from a second device. The method further includes the first device determining a sidelink feedback resource associated with the sidelink transmission at least based on the identifier and a source ID (Identity) associated with the sidelink transmission. In addition, the method includes the first device using the sidelink feedback resource to transmit a feedback in response to the sidelink transmission to the second device.

BRIEF DESCRIPTION OF THE DRAWINGS

FIG. 13 is a diagram according to one exemplary embodiment.

FIGS. 14A and 14B are diagrams according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.6.0, "E-UTRA and E-UTRAN Overall Description; Stage 2 (Release 15)"; TR 22.886 V16.2.0, "Study on enhancement of 3GPP Support for 5G V2X Services (Release 16)"; TS 23.287 V1.0.0, "Architecture enhancements for 5G System (5GS) to support Vehicle-to-Everything (V2X) services (Release 16)"; TR 38.885 V16.0.0, "NR; Study on NR Vehicle-to-Everything (V2X) (Release 16)"; 3GPP RAN1 #95 meeting report; 3GPP RAN1 #96bis meeting report; 3GPP RAN1 #97 meeting report; 3GPP RAN2 #105 meeting report; and R2-1906427, "On HARQ feedback support for groupcast", Intel Corporation, 3GPP RAN2 #106 meeting. The standards and documents listed above are hereby expressly incorporated by reference in their entirety.

Figure 1:
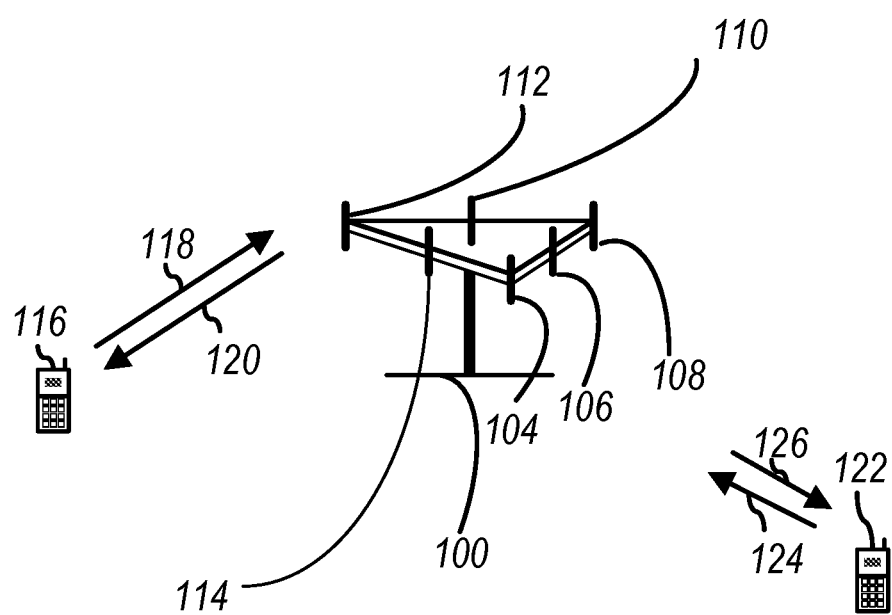
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
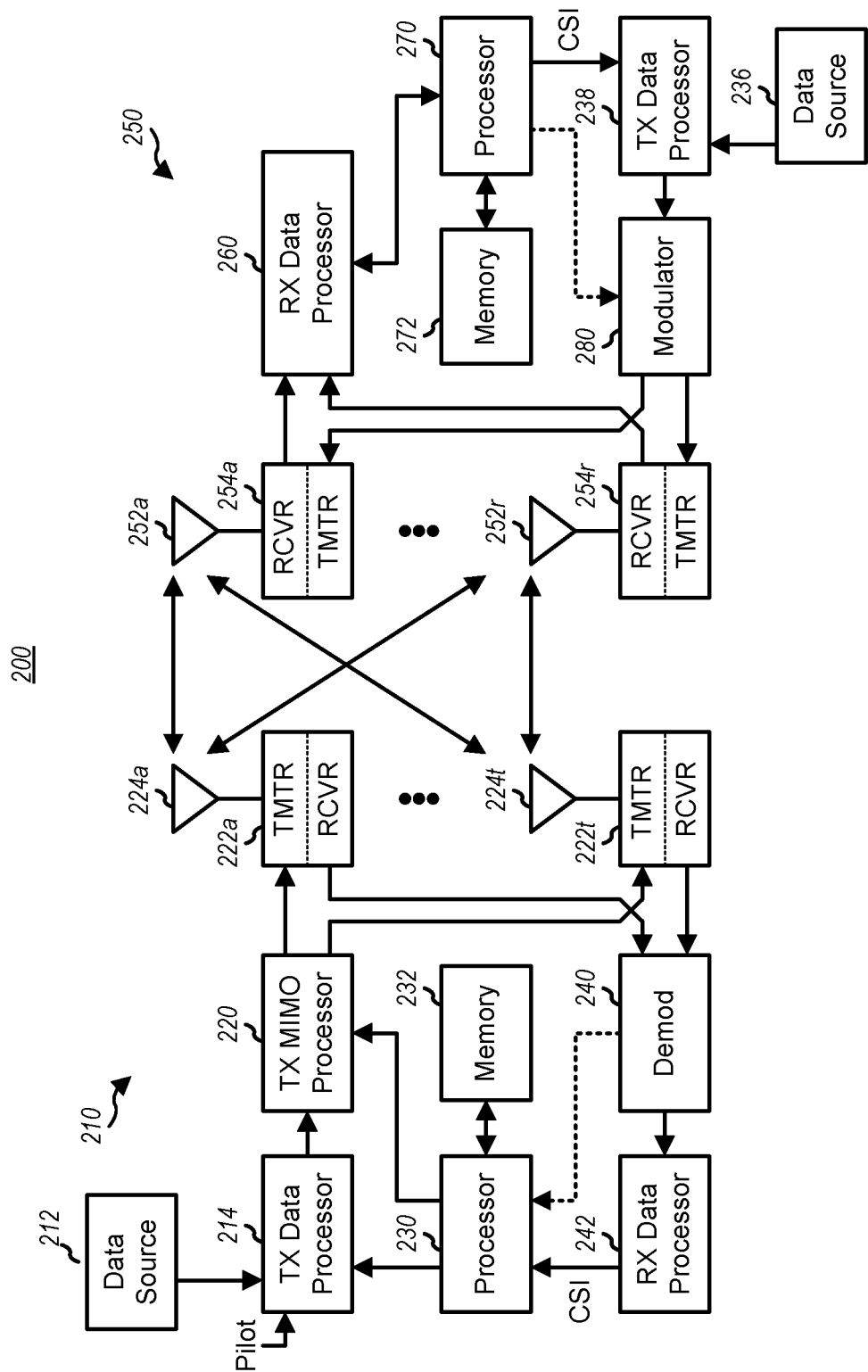
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
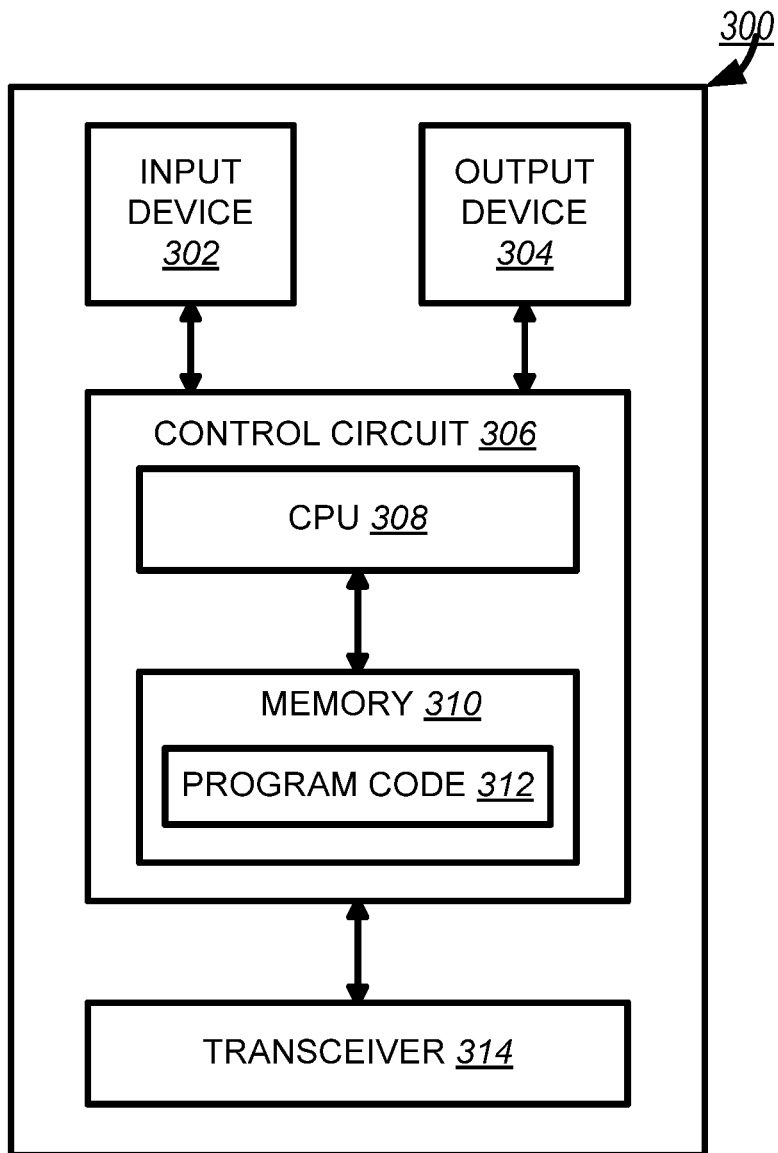
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
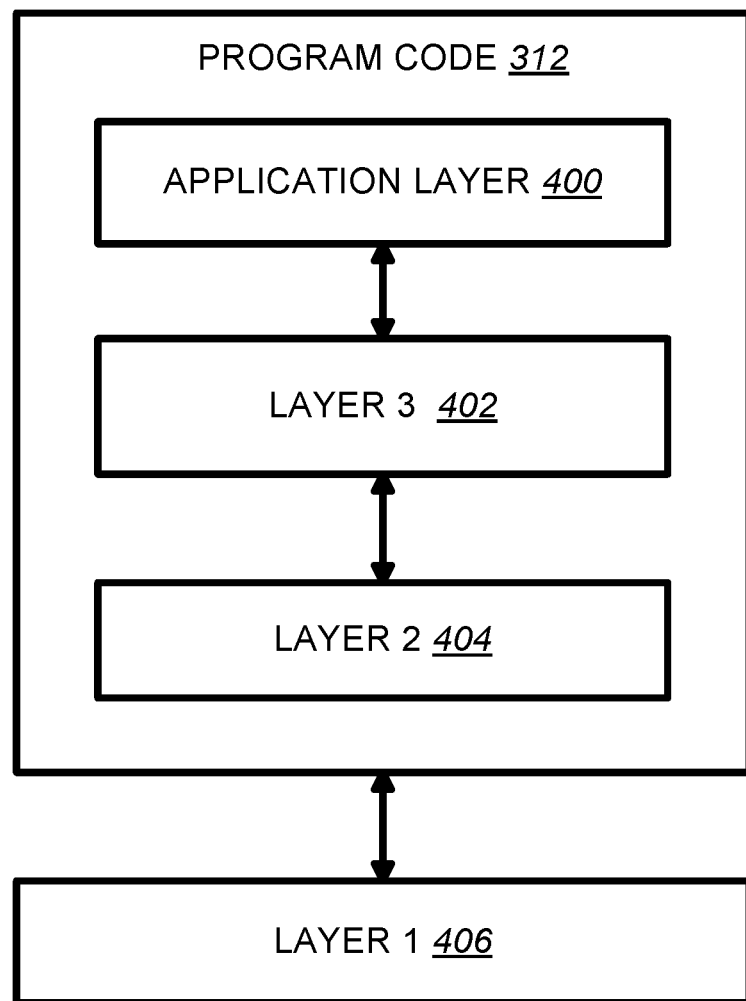
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In 3GPP TS 36.300, V2X (Vehicle-to-Everything) service for LTE is introduced as follows:

23.14 Support for V2X Services 23.14.1 General

Vehicular communication services, represented by V2X services, can consist of the following four different types: V2V, V2I, V2N and V2P, as specified in TS 22.185 [71]. V2X services can be provided by PC5 interface and/or Uu interface. Support of V2X services via PC5 interface is provided by V2X sidelink communication, which is a mode of communication whereby UEs can communicate with each other directly over the PC5 interface, as specified in TS 23.303 [62]. This communication mode is supported when the UE is served by E-UTRAN and when the UE is outside of E-UTRA coverage. Only the UEs authorised to be used for V2X services can perform V2X sidelink communication.

23.14.1.1 Support for V2X Sidelink Communication

The user plane protocol stack and functions, as specified in subclause 23.10.2.1 for sidelink communication, are also used for V2X sidelink communication. In addition, for V2X sidelink communication:
  STCH for sidelink communication is also used for V2X sidelink communication.
  Non-V2X (e.g. Public Safety) data is not multiplexed with V2X data transmitted in resources configured for V2X sidelink communication.
  The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value (TS 23.285 [72]).
  The Access Stratum (AS) is provided with a transmit profile (TS 23.285 [72]) of a protocol data unit transmitted over PC5 interface by upper layers.
  The logical channel prioritization based on PPPP is used for V2X sidelink communication.
  Control plane protocol stack for SBCCH as specified in subclause 23.10.2.2 for sidelink communication is also used for V2X sidelink communication.

The UE supporting V2X sidelink communication can operate in two modes for resource allocation:
  Scheduled resource allocation, characterized by:
    The UE needs to be RRC_CONNECTED in order to transmit data;
    The UE requests transmission resources from the eNB. The eNB schedules transmission resources for transmission of sidelink control information and data. Sidelink SPS is supported for scheduled resource allocation;
  UE autonomous resource selection, characterized by:
    The UE on its own selects resources from resource pools and performs transport format selection to transmit sidelink control information and data;
    If mapping between the zones and V2X sidelink transmission resource pools is configured, the UE selects V2X sidelink resource pool based on the zone UE is located in.
    The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

In order to assist the eNB to provide sidelink resources, the UE in RRC_CONNECTED may report geographical location information to the eNB. The eNB can configure the UE to report the complete UE geographical location information based on periodic reporting via the existing measurement report signaling.

Geographical zones can be configured by the eNB or pre-configured. When zones are (pre)configured, the world is divided into geographical zones using a single fixed reference point (i.e. geographical coordinates (0, 0)), length and width. The UE determines the zone identity by means of modulo operation using length and width of each zone, number of zones in length, number of zones in width, the single fixed reference point and the geographical coordinates of the UE's current location. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB can provide the mapping between zone(s) and V2X sidelink transmission resource pools in RRC signalling. For out of coverage UEs, the mapping between the zone(s) and V2X sidelink transmission resource pools can be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In order to avoid interruption time in receiving V2X messages due to delay in acquiring reception pools broadcasted from the target cell, synchronisation configuration and reception resource pool configuration for the target cell can be signaled to RRC_CONNECTED UEs in the handover command. For RRC_IDLE UE, it is up to UE implementation to minimize V2X sidelink transmission/reception interruption time associated with acquisition of SIB21 of the target cell.

A UE is considered in-coverage on the carrier used for V2X sidelink communication whenever it detects a cell on that carrier as per criteria specified in TS 36.331 [16]. If the UE that is authorized for V2X sidelink communication is in-coverage on the frequency used for V2X sidelink communication or if the eNB provides V2X sidelink configuration for that frequency (including the case where UE is out of coverage on that frequency), the UE uses the scheduled resource allocation or UE autonomous resource selection as per eNB configuration. When the UE is out of coverage on the frequency used for V2X sidelink communication and if the eNB does not provide V2X sidelink configuration for that frequency, the UE may use a set of transmission and reception resource pools pre-configured in the UE. V2X sidelink communication resources are not shared with other non-V2X data transmitted over sidelink.

An RRC_CONNECTED UE may send a Sidelink UE Information message to the serving cell if it is interested in V2X sidelink communication transmission in order to request sidelink resources.

If the UE is configured by upper layers to receive V2X sidelink communication and V2X sidelink reception resource pools are provided, the UE receives on those provided resources.

Reception of V2X sidelink communication in different carriers/PLMNs can be supported by having multiple receiver chains in the UE.

For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

The serving cell can provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and GNSS. In case GNSS is configured as synchronization source, the UE utilizes the UTC time and (pre)configured DFN offset to calculate direct frame number and subframe number. In case eNB timing is configured as synchronization reference to the UE, for synchronization and DL measurements, the UE follows the cell associated with the concerned frequency (when in-coverage on this frequency), or the PCell or the serving cell (when out of coverage on the concerned frequency). UE can indicate the current synchronization reference type it is using to the eNB. One transmission pool for scheduled resource allocation is configured, taking into account the synchronization reference of the UE.

For controlling channel utilization, the network is able to indicate how the UE adapts its transmission parameters for each transmission pool depending on the Channel Busy Ratio (CBR). The UE measures all the configured transmission pools including exceptional pool. If a pool is (pre)configured such that a UE shall always transmit PSCCH and PSSCH in adjacent resource blocks the UE measures PSCCH and PSSCH resources together. If a pool is (pre)configured such that a UE may transmit PSCCH and the corresponding PSSCH in non-adjacent resource blocks in a subframe then PSSCH pool and PSCCH pool are measured separately.

A UE in RRC_CONNECTED can be configured to report CBR measurement results. For CBR reporting, periodic reporting and event triggered reporting are supported. Two reporting events are introduced for event-triggered CBR reporting. In case PSSCH and PSCCH resources are placed non-adjacently, only PSSCH pool measurement is used for event-triggered CBR reporting. In case PSSCH and PSCCH resources are placed adjacently, CBR measurement of both the PSSCH and PSCCH resources is used for event-triggered CBR reporting. Event-triggered CBR reporting is triggered by overloaded threshold and/or less-loaded threshold. The network can configure which of the transmission pools the UE needs to report.

A UE (regardless of its RRC state) performs transmission parameter adaptation based on the CBR. In case PSSCH and PSCCH resources are placed non-adjacently, only PSSCH pool measurement is used for transmission parameter adaptation. In case PSSCH and PSCCH resources are placed adjacently, CBR measurement of both the PSSCH and PSCCH resources is used for transmission parameter adaptation. When CBR measurements are not available, the default transmission parameters are used. The exemplary adapted transmission parameters include maximum transmission power, range of the number of retransmission per TB, range of PSSCH RB number, range of MCS, maximum limit on channel occupancy ratio. The transmission parameter adaption applies to all transmission pools including exceptional pool.

A UE using scheduled resource allocation may be configured to perform sensing and report the sensing result. The UE performs sensing only in the V2X sidelink transmission resource pool(s) for which sensing result is configured to be reported. Only periodic reporting is supported.

For V2X sidelink communication, sidelink transmission and/or reception resources including exceptional pool for different frequencies for scheduled resource allocation and UE autonomous resource selection may be provided. The sidelink resources for different frequencies can be provided via dedicated signalling, SIB21 and/or preconfiguration. The serving cell may indicate to the UE only the frequency on which the UE may acquire the resource configuration for V2X sidelink communication. If multiple frequencies and associated resource information are provided, it is up to UE implementation to select the frequency among the provided frequencies. The UE shall not use preconfigured transmission resource if the UE detects a cell providing resource configuration or inter-carrier resource configuration for V2X sidelink communication. Frequencies which may provide V2X sidelink communication resource configuration or cross-carrier configuration can be signalled in SIB21 or pre-configured in the UE. The RRC_IDLE UE may prioritize the frequency that provides cross-carrier resource configuration for V2X sidelink communication during cell reselection.

If the UE supports multiple transmission chains, it may simultaneously transmit on multiple carriers via PC5. For the case where multiple frequencies for V2X are supported, a mapping between V2X service types and V2X frequencies is configured by upper layers. The UE should ensure a V2X service to be transmitted on the corresponding frequency. For scheduled resource allocation, the eNB can schedule a V2X transmission on a frequency based on the Sidelink BSR, as specified in TS 36.321 [13], in which the UE includes the Destination Index uniquely associated with a frequency reported by the UE to the eNB in Sidelink UE Information message as specified in TS 36.331 [16].

Carrier aggregation (CA) in sidelink is supported for V2X sidelink communication. It applies to both in coverage UEs and out of coverage UEs. For CA in sidelink, neither primary component carrier nor secondary component carriers are defined. Each resource pool (pre)configured for V2X sidelink communication transmission or reception is associated to a single carrier. When a UE supporting CA in sidelink uses autonomous resource selection, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. All selected carriers should have the same synchronization reference or the same synchronization priority configuration. For a UE using autonomous resource selection, logical channel prioritization is performed for a sidelink resource on a carrier depending on the CBR measured on the carrier and the PPPP of the sidelink logical channels as specified in TS 36.321 [13].

Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre) configuration. Sidelink packet duplication does not apply to transmission with Rel-14 transmit profile (TS 23.285 [72]). The PPPR value(s) for which sidelink packet duplication is supported can be (pre)configured via a PPPR threshold. For UE autonomous resource selection and scheduled resource allocation, the UE shall perform sidelink packet duplication for the data with the configured PPPR value(s) until packet duplication is deconfigured for these PPPR value(s). For scheduled resource allocation, the UE reports the amount of data associated with one or more PPPR values, and the destination(s) to which the data belongs via sidelink BSR(s). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE.

For a UE using scheduled resource allocation, two non-overlapped sets of carriers are configured by the eNB per Destination reported by the UE to the network, and they apply to all the PPPR(s) that are configured for sidelink packet duplication. The UE then associates two duplicated sidelink logical channels corresponding to the same PDCP entity respectively with the two sets of carriers configured for the Destination of the two sidelink logical channels. The association between the duplicated sidelink logical channel and the carrier set is up to UE implementation. Data of a duplicated sidelink logical channel can only be transmitted on the carrier(s) in the associated carrier set.

For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively as specified in TS 36.321 [13].

The UE may receive the V2X sidelink communication of other PLMNs. The serving cell can indicate to the UE the resource configuration for V2X sidelink communication reception for inter-PLMN operation directly or only the frequency on which the UE may acquire the inter-PLMN resource configuration for V2X sidelink communication reception. V2X sidelink communication transmission in other PLMNs is not allowed.

When UL transmission overlaps in time domain with V2X sidelink transmission in the same frequency, the UE prioritizes the V2X sidelink transmission over the UL transmission if the PPPP of sidelink MAC PDU is lower than a (pre)configured PPPP threshold; otherwise, the UE prioritizes the UL transmission over the V2X sidelink transmission. When UL transmission overlaps in time domain with V2X sidelink transmission in different frequency, the UE may prioritize the V2X sidelink transmission over the UL transmission or reduce UL transmission power if the PPPP of sidelink MAC PDU is lower than a (pre)configured PPPP threshold; otherwise, the UE prioritizes the UL transmission over the V2X sidelink transmission or reduces V2X sidelink transmission power. However, if UL transmission is prioritized by upper layer as specified in TS 24.386 [75] or random access procedure is performed, the UE prioritizes UL transmission over any V2X sidelink transmission (i.e. irrespectively of the sidelink MAC PDU's PPPP).

Resource pool for transmission of pedestrian UE (P-UE) may be overlapped with resources for V2X sidelink communication. For each transmission pool, resource selection mechanism (i.e. random selection, partial sensing based selection or either random selection or partial sensing based selection), which is allowed to be used in this pool, is also configured. If P-UE is configured to use either random selection or partial sensing based selection for one transmission pool, it is up to UE implementation to select a specific resource selection mechanism. If the P-UE is configured to use partial sensing based selection only, the P-UE shall use partial sensing based selection in the pool. The P-UE shall not do random selection in the pool wherein only partial sensing is allowed. If the eNB does not provide a random selection pool, the P-UEs that support only random selection cannot perform sidelink transmission. In exceptional pool, the P-UE uses random selection. The P-UE can send Sidelink UE Information message to indicate that it requests resource pools for P2X-related V2X sidelink communication transmission as specified in TS 36.331 [16].

It is not mandatory for P-UE to support zone based resource selection. The P-UE reports whether it supports zone based resource selection as part of UE capability signalling. If the P-UE supports zone based resource selection, the network can provide zone based configuration via only dedicated signalling.

Power saving of P-UE can be achieved by UE implementation and upper layer mechanisms. P-UE does not perform CBR measurement. However, P-UE adjusts the transmission parameters based on the default transmission parameter configuration, which can be provided to the P-UE via RRC signalling.

To support the co-existence of CEN DSRC and V2X sidelink communication, the upper layers of the UE which is performing V2X sidelink communication send an indication to lower layers when the UE is within the proximity of CEN DSRC tolling station(s).

23.14.1.2 Support for V2X Communication Via Uu

For V2X communication in uplink, maximum 8 SPS configurations with different parameters can be configured by eNB and all SPS configurations can be active at the same time. The activation/deactivation of each SPS configuration is signalled via PDCCH by eNB. The existing logical channel prioritization for Uu is used.

For V2X communication, UE assistance information can be provided to eNB. Reporting of UE assistance information is configured by eNB. The UE assistance information includes parameters (e.g. a set of preferred SPS interval, timing offset with respect to subframe 0 of the SFN 0, LCID and maximum TB size based on observed traffic pattern) related to the SPS configuration. Triggering of UE assistance information transmission is left to UE implementation. For instance, the UE is allowed to report the UE assistance information when change in estimated periodicity and/or timing offset of packet arrival occurs. For V2X communication via Uu, SR mask as per legacy mechanism can be used.

For unicast transmission of V2X messages, the V2X message can be delivered via Non-GBR bearers as well as GBR bearers. In order to meet the QoS requirements for V2X message delivery for V2X services, a Non-GBR QCI value and a GBR QCI value for V2X messages are used as specified in TS 23.285 [72].

For broadcasting V2X messages, SC-PTM or MBSFN transmission can be used. In order to reduce SC-PTM/MBSFN latency, shorter (SC-)MCCH repetition period for SC-PTM/MBSFN, modification period for SC-PTM/MBSFN and MCH scheduling period for MBSFN are supported. Reception of downlink broadcast of V2X messages in different carriers/PLMNs can be supported by having multiple receiver chains in the UE. A GBR QCI value is used for the delivery of V2X messages over MBMS bearers as specified in TS 23.285 [72].

In 3GPP TR 22.886, vehicle platooning with a leader vehicle is introduced in 5G V2X as follows:

5.1 eV2X Support for Vehicle Platooning 5.1.1 Description

Platooning is operating a group of vehicles in a closely linked manner so that the vehicles move like a train with virtual strings attached between vehicles. To maintain distance between vehicles, the vehicles needs to share status information such as speed, heading and intentions such as braking, acceleration, etc. By use of platooning, the distances between vehicles can be reduced, overall fuel consumption is lowered, and the number of needed drivers can be reduced.

Following aspects need to be supported for platooning.
Join Leave

To form a platoon, vehicles need to exchange intent such as interest to form a platoon, intention to be a leader or follower of the platoon. And when a vehicle reaches a destination or has to leave the platoon, this intent should be also exchanged among vehicles of the platoon. This exchange of intent can occur at any time while the platoon is active.

Announcement/Warning

When a platoon is formed and operational, a vehicle which do not belong to the platoon should aware the existence of the platoon. Otherwise, the vehicle may move into the middle of the platoon and disrupt the operation of the platoon. Thus, the platoon should be known to other vehicles beyond the communication range among vehicles of the same platoon.

Group Communication

There are several messages that are exchanged for platoon management. E.g., vehicles of the platoon need to exchange information regarding when to take which road, whether to brake or accelerate and when, etc. At least, 30 CAM messages/seconds needs to be supported. [3]. In addition, the lead vehicle consume more fuel than other vehicles, sometime lead vehicle may request next vehicle to be a leader. This kind of communication can be done between the two vehicles without other vehicles' involvement.

To prevent potential security threats such as revealing of the route, these messages should be supported with confidentiality and be deciphered only by the vehicles of the platoon. In addition, due to the private nature of the messages, the communication range of these messages is from the lead vehicle to the last vehicle of the platoon, and typically line-of-sight. Because the size of the platoon can differ even on the move, resource-efficient distribution of messages for platooning and dynamic control of the distribution area of the messages should be supported.

Two sets of Platooning performances requirements are supported:

Set 1: According to [11][2], the distance between vehicles for normal density platooning may be larger than 2 meters. When the platoon moves at 100 km/h, vehicles move 1 meter in 36 ms. Considering the round-trip-time and processing delay, message transmission frequency up to 40 Hz, translating into 25 ms radio latency with message sizes of around 300-400 bytes should be supported.

Set 2: According to [2], the distance between vehicles for high density platooning is 1 meter. When the platoon moves at 100 km/h, vehicles move 1 meter in 36 ms. Considering round-trip-time and processing delay, message transmission frequency up to 100 Hz, translating into at least 10 ms latency with message sizes of around 50-1200 bytes should be supported.

If the platoon is too long, it will sometimes interrupt the operation of other vehicles and traffic management authority. So, there should be limit on how many vehicles can be included in a platoon. This is especially true considering that a truck can span more than 15 m.

In 3GPP TS 23.287, the architecture for NR V2X is introduced as follows:

4 Architecture Model and Concepts

4.1 General Concept

There are two modes of operation for V2X communication, namely V2X communication over PC5 reference point and V2X communication over Uu reference point. These two operation modes may be used by a UE independently for transmission and reception.

V2X communications over PC5 reference point are supported by LTE and/or NR.

V2X communications over Uu reference point are supported by E-UTRA connected to 5GC and/or NR connected to 5GC. In this release, V2X communication over Uu reference point is only unicast.

4.2 Architectural Reference Model

4.2.1 PC5 and Uu Based V2X Architecture Reference Model

4.2.1.1 Non-Roaming 5G System Architecture for V2X Communication Over PC5 and Uu Reference Points FIG. 4.2.1.1-1 shows the high level view of the non-roaming 5G System architecture for V2X communication over PC5 and Uu reference points.

Figure 5:
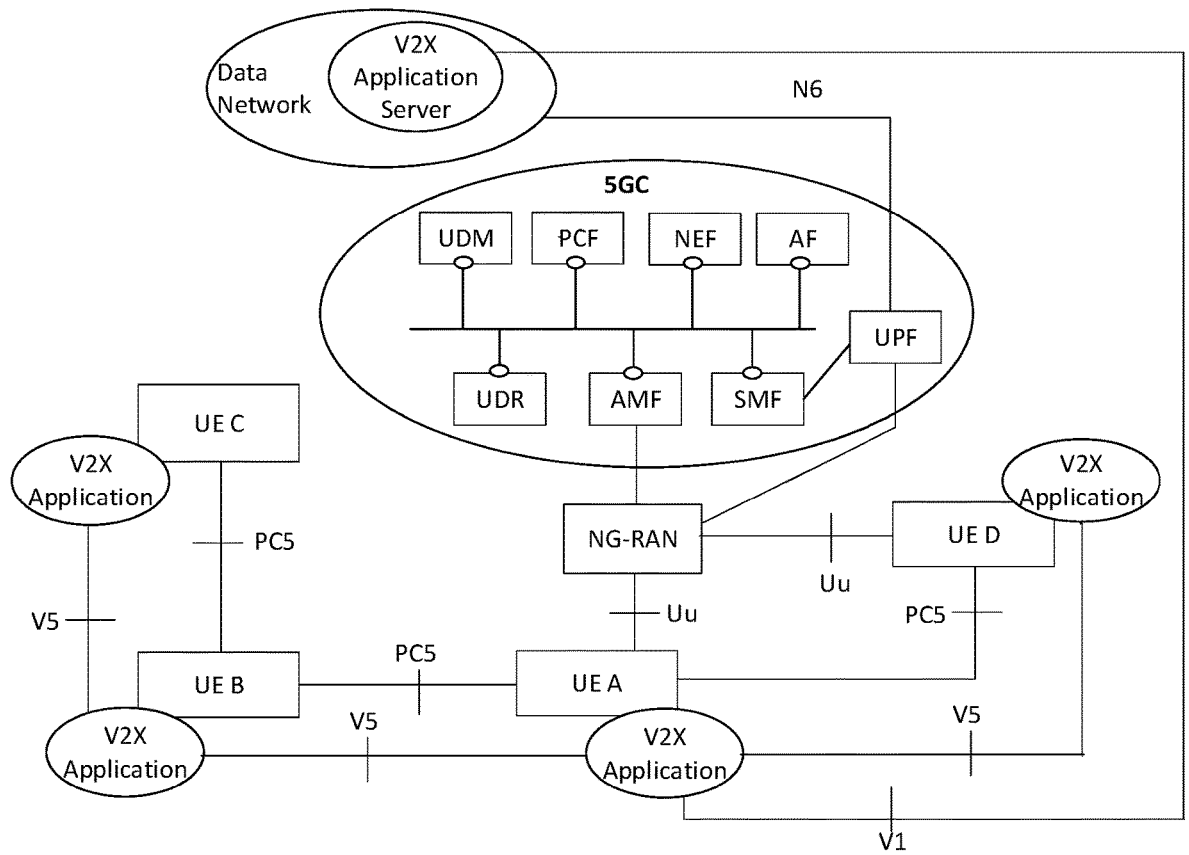
FIG. 5 is a reproduction of FIG. 4.2.1.1-1 of 3GPP TS 23.287 V1.0.0.

[FIG. 4.2.1.1-1 of 3GPP TS 23.287 V1.0.0, entitled "Non-roaming 5G System architecture for V2X communication over PC5 and Uu reference points", is reproduced as FIG. 5]

Furthermore, in 3GPP TS 23.287, identifiers for NR V2X communication are introduced are as follows:

5.6 Identifiers

5.6.1 Identifiers for V2X Communication Over PC5 Reference Point

5.6.1.1 General

Each UE has one or more Layer-2 IDs for V2X communication over PC5 reference point, consisting of:

Source Layer-2 ID(s); and

Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described in clauses 5.6.1.2, 5.6.1.3, and 5.6.1.4. The source Layer-2 IDs may differ between different communication modes.

When IP-based V2X communication is supported, the UE configures a link local IPv6 address to be used as the source IP address, as defined in clause 4.5.3 of TS 23.303 [17]. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration described in clause 5.1.2.1, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g. when the application layer identifier changes, the source Layer-2 ID and the source IP address need to be changed.

5.6.1.2 Identifiers for Broadcast Mode V2X Communication Over PC5 Reference Point For broadcast mode of V2X communication over PC5 reference point, the UE is configured with the destination Layer-2 ID(s) to be used for V2X services. The destination Layer-2 ID for a V2X communication is selected based on the configuration as described in clause 5.1.2.1.

The UE self-selects a source Layer-2 ID. The UE may use different source Layer-2 IDs for different types of PC5 reference points, i.e. LTE based PC5 and NR based PC5.

5.6.1.3 Identifiers for Groupcast Mode V2X Communication Over PC5 Reference Point For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g. PSID/ITS-AID) and Layer-2 ID, as specified in clause 5.1.2.1.

NOTE: The mechanism for converting the V2X application layer provided group identifier to the destination Layer-2 ID is defined in Stage 3.

The UE self-selects a source Layer-2 ID.

Editor's note: Further updates of the identifiers description may be required based on RAN WG feedback.

5.6.1.4 Identifiers for Unicast Mode V2X Communication Over PC5 Reference Point For unicast mode of V2X communication over PC5 reference point, the destination Layer-2 ID used depends on the communication peer, which is discovered during the establishment of the unicast link. The initial signalling for the establishment of the unicast link may use a default destination Layer-2 ID associated with the service type (e.g. PSID/ITS-AID) configured for unicast link establishment, as specified in clause 5.1.2.1. During the unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE needs to maintain a mapping between the Application Layer IDs and the source Layer-2 IDs used for the unicast links, as the V2X application layer does not use the Layer-2 IDs. This allows the change of source Layer-2 ID without interrupting the V2X applications.

When Application Layer IDs change, the source Layer-2 ID(s) of the unicast link(s) shall be changed if the link(s) was used for V2X communication with the changed Application Layer IDs.

A UE may establish multiple unicast links with a peer UE and use the same or different source Layer-2 IDs for these unicast links.

6.3.2 Groupcast Mode V2X Communication Over PC5 Reference Point

To perform groupcast mode of V2X communication over PC5 reference point, the UE is configured with the related information as described in clause 5.1.2.1.

Figure 6:
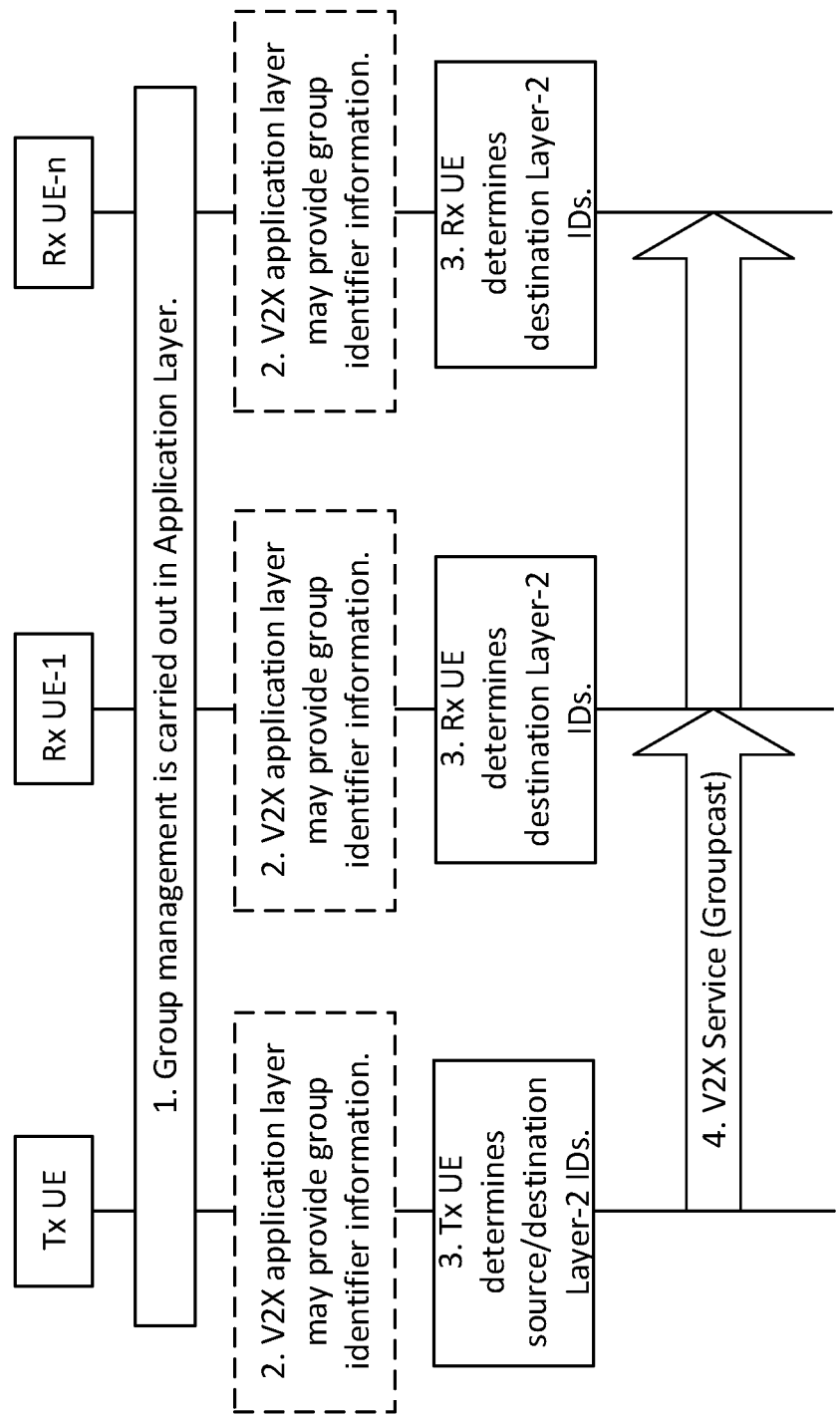
FIG. 6 is a reproduction of FIG. 6.3.2-1 of 3GPP TS 23.287 V1.0.0.

FIG. 6.3.2-1 shows the procedure for groupcast mode of V2X communication over PC5 reference point.

[FIG. 6.3.2-1 of 3GPP TS 23.287 V1.0.0, entitled "Procedure for groupcast mode of V2X communication over PC5 reference point", is reproduced as FIG. 6]

1. V2X group management is carried out by the V2X application layer and is out of scope of this specification.
2. The V2X application layer may provide group identifier information (i.e. an Application-layer V2X Group identifier) as specified in clause 5.6.1.3.
    The V2X application layer may provide service requirements for this communication.
3. Transmitting UE determines a source Layer-2 ID and a destination Layer-2 ID and Receiving UE(s) determine destination Layer-2 ID, as specified in clauses 5.6.1.1 and 5.6.1.3.
    The destination Layer-2 ID is passed down to the AS layer of Receiving UE(s) for the group communication reception.
    Transmitting UE determines the PC5 QoS parameters for this groupcast as specified in clauses 5.4.1.1 and 5.4.1.3.
4. Transmitting UE has a V2X service associated with this group communication.
    Transmitting UE sends the V2X service data using the source Layer-2 ID and the destination Layer-2 ID.
    NOTE: In step 4, there is only one groupcast message from the transmitting UE In 3GPP TR 38.885, a NR sidelink unicast, groupcast, and broadcast design is introduced as follows:

5 Sidelink (PC5) Aspects

5.1 NR Sidelink Unicast, Groupcast, and Broadcast Design

SL broadcast, groupcast, and unicast transmissions are supported for the in-coverage, out-of-coverage and partial-coverage scenarios.

The AS protocol stack for the control plane in the PC5 interface consists of at least RRC, PDCP, RLC and MAC sublayers, and the physical layer. The protocol stack of PC5-C is shown in FIGS. 5.1-1.

Figure 7:
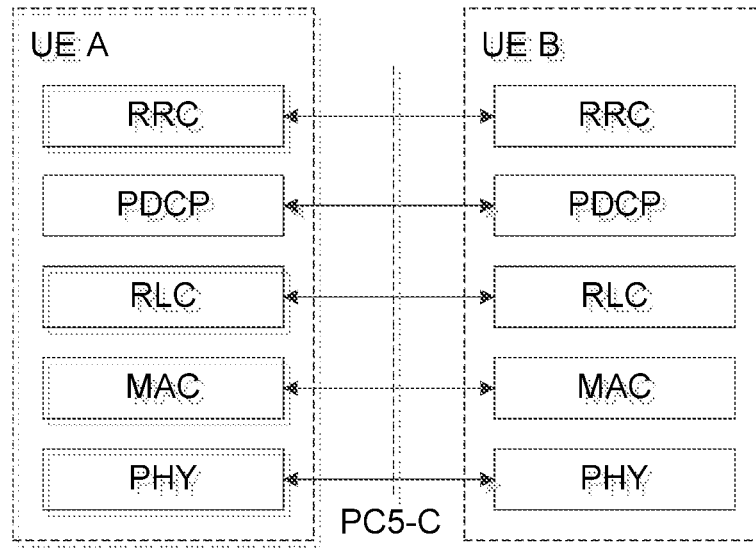
FIG. 7 is a reproduction of FIGS. 5.1-1 of 3GPP TR 38.885 V16.0.0.

[FIGS. 5.1-1 of 3GPP TR 38.885 V16.0.0, entitled "PC5 control plane (PC5-C) protocol stack", is reproduced as FIG. 7]

The AS protocol stack for user plane in the PC5 interface consists of SDAP, PDCP, RLC and MAC sublayers, and the physical layer. The protocol stack of PC5-U is shown in FIGS. 5.1-2.

Figure 8:
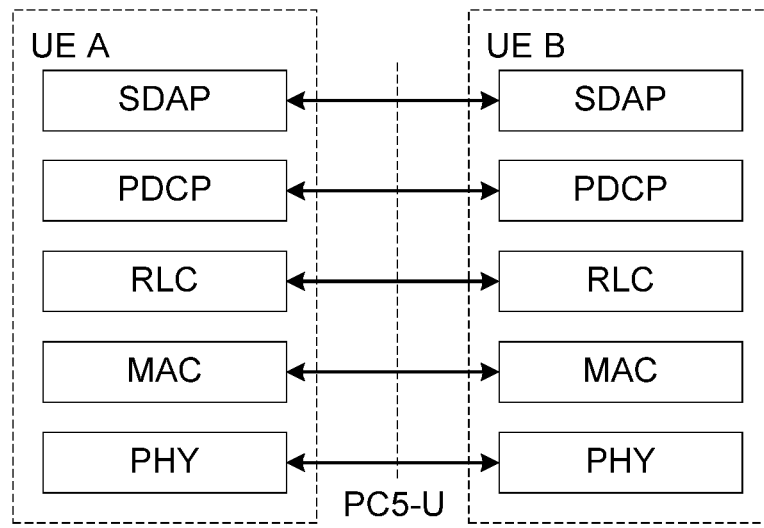
FIG. 8 is a reproduction of FIGS. 5.1-2 of 3GPP TR 38.885 V16.0.0.

[FIGS. 5.1-2 of 3GPP TR 38.885 V16.0.0, entitled "PC5 user plane (PC5-U) protocol stack", is reproduced as FIG. 8].

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following information is known to the physical layer:

Identities:
  The layer-1 source and destination IDs, conveyed in SCI
  Additional layer-1 ID(s), conveyed via PSCCH, at least for the purpose of identifying which transmissions can be combined in reception when HARQ feedback is in use (see Section 5.1.2.2)
  HARQ process ID For the purpose of Layer 2 analysis, it is assumed that upper layers (i.e. above AS) provide the information on whether it is a unicast, groupcast or broadcast transmission for a particular data transfer. For the unicast and groupcast transmission in SL, the following information is known to Layer 2:

Identities:
  Unicast: destination ID, source ID
  Groupcast: destination Group ID, source ID Any UE configured to receive a group destination Layer 2 ID is allowed to receive the groupcast transmission, whether it is within or beyond the "minimum communication range" provided by upper layers.

For AS-level link management in unicast, SL RLM/RLF declaration is supported. For RLC AM in SL unicast, RLF declaration is triggered by indication from RLC that the maximum number of retransmissions has been reached. The AS-level link status (e.g., failure) should be informed to upper layers. No RLM design specific to groupcast, different than the RLM procedure for unicast, is considered. There is no need for RLM/RLF declarations among group members for groupcast.

Discovery procedure and related messages for unicast and groupcast transmission are up to upper layers.

5.1.1 Physical Layer Structures

In this section, the design of a physical SL control channel (PSCCH), a physical SL shared channel (PSSCH), a physical SL feedback channel (PSFCH) and other matters related to physical layer structures are studied. In addition to what is discussed in this TR, at least aspects related to modulation, scrambling, RE mapping and rate matching would be included in normative work. For design of the physical SL broadcast channel (PSBCH), refer to Section 5.2.

The waveform supported in the study is CP-OFDM.

5.1.1.1 Subcarrier Spacing and Cyclic Prefix

In FR1, 15 kHz, 30 kHz and 60 kHz SCS are supported with normal CP, and 60 kHz SCS with extended CP. In FR2, 60 kHz and 120 kHz SCS are supported with normal CP, and 60 kHz SCS with extended CP. In a given carrier, a UE is not required to receive simultaneously SL transmissions with more than one combination of SCS and CP, nor transmit simultaneously SL transmissions with more than one combination of SCS and CP. The numerology configuration is part of the SL BWP configuration (see Section 5.1.1.3).

5.1.1.2 Channel Coding

The channel coding defined for data and control in NR Uu are respectively the starting points for data and control on the NR SL.

5.1.1.3 SL Bandwidth Parts and Resource Pools

BWP is defined for SL, and the same SL BWP is used for transmission and reception. In specification terms, in a licensed carrier, SL BWP would be defined separately, and have separate configuration signalling, from Uu BWP. One SL BWP is (pre-)configured for RRC IDLE and out-of-coverage NR V2X UEs in a carrier. For UEs in RRC_CONNECTED mode, one SL BWP is active in a carrier. No signalling is exchanged over SL for the activation or deactivation of a SL BWP.

In a carrier, only one SL BWP is configured for a UE, and the UE is not expected to use at the same time a different numerology in the SL BWP than an active UL BWP.

A resource pool is a set of time-frequency resources that can be used for SL transmission and/or reception. From the UE point of view, a resource pool is inside the UE's bandwidth, within a SL BWP and has a single numerology. Time domain resources in a resource pool can be non-contiguous. Multiple resource pools can be (pre-)configured to a UE in a carrier.

5.1.1.4 Resource Arrangements

NR V2X may be deployed in a carrier dedicated to ITS services, or a carrier shared with cellular services. Therefore, resource arrangements where all the symbols in a slot are available for SL, and where only a subset of consecutive symbols in a slot (which are not dynamically indicated) are available for SL are supported. The latter case is not intended for use in ITS spectrum, if normative specification work does not find a forward compatibility issue.

Resource allocation for PSSCH is based on the concept of sub-channels in the frequency domain, and a UE performs either transmission or reception in a slot on a carrier. Blind retransmissions of a TB are supported, and resource allocation Mode 2 (see section 5.3.1) supports reservation of SL resources at least for such blind retransmission.

PSFCH (see section 5.1.2.2) supports at least a format which uses the last symbol(s) available for SL in a slot.

5.1.1.5 Reference Signals

DM-RS associated with PSSCH are transmitted in one of several possible patterns in the time domain. In FR2, a PT-RS for PSSCH is also supported.

Other candidate reference signals are: CSI-RS (see section 5.1.2.3 for CSI procedure), SRS, and AGC training signal.

5.1.2 Physical Layer Procedures

In this section, physical layer procedures are studied. For procedures related to SL synchronization, refer to Section 5.2

5.1.2.1 Multiplexing of Physical Channels

For the purposes of this section, a PSSCH is said to be "associated" to a PSCCH when the PSCCH carries at least the SCI necessary to decode the PSSCH. The following options for multiplexing of a PSCCH and associated PSSCH are studied:

Option 1: PSCCH and the associated PSSCH are transmitted using non-overlapping time resources.
  Option 1A: The frequency resources used by the two channels are the same.
  Option 1B: The frequency resources used by the two channels can be different.
Option 2: PSCCH and the associated PSSCH are transmitted using non-overlapping frequency resources in the all the time resources used for transmission. The time resources used by the two channels are the same.
Option 3: Part of PSCCH and the associated PSSCH are transmitted using overlapping time resources in non-overlapping frequency resources, but another part of the associated PSSCH and/or another part of the PSCCH are transmitted using non-overlapping time resources.
Of the options described above, at least Option 3 is supported. (Editor's note: this is a RAN1 working assumption).

5.1.2.2 HARQ Procedures

5.1.2.2.1 General HARQ Procedure

For SL unicast and groupcast, HARQ feedback and HARQ combining in the physical layer are supported. HARQ-ACK feedback for a PSSCH is carried in SFCI format(s) via PSFCH in resource allocation Modes 1 and 2.

When SL HARQ feedback is enabled for unicast, in the case of non-CBG operation the receiver UE generates HARQ-ACK if it successfully decodes the corresponding TB. It generates HARQ-NACK if it does not successfully decode the corresponding TB after decoding the associated PSCCH targeted to the receiver UE.

When SL HARQ feedback is enabled for groupcast, it is supported to use TX-RX distance and/or RSRP in deciding whether to send HARQ feedback. In the case of non-CBG operation, two options are supported: (Editor's note: This is a RAN1 working assumption)

Option 1: Receiver UE transmits HARQ-NACK on PSFCH if it fails to decode the corresponding TB after decoding the associated PSCCH. It transmits no signal on PSFCH otherwise.

Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.

5.1.2.2.2 HARQ Procedure Details for Mode 1 Resource Allocation

The time between PSSCH and sending HARQ feedback on PSFCH is (pre-)configured. For unicast and groupcast, if retransmission is needed on the SL, this can be indicated to the gNB by an in-coverage UE using PUCCH. It is supported that the transmitter UE sends the indication to its serving gNB in a form such as SR/BSR, but not in the form of HARQ ACK/NACK.

The study considered an additional option of the receiver UE sending the indication to its serving gNB, as HARQ ACK/NACK, and assuming no inter-BS communication.

SL re-transmission resources can also be scheduled by the gNB without receiving such an indication.

5.1.2.2.3 HARQ Procedure Details for Mode 2 Resource Allocation

The time between PSSCH and sending HARQ feedback on PSFCH is (pre-)configured.

In 3GPP RAN1 #95 meeting [5], some agreements have been made about NR V2X.

Agreements:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
FFS whether to support SL HARQ feedback per CBG Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise. Details are FFS including the following:
Whether to introduce an additional criterion in deciding HARQ-NACK transmission
Whether/how to handle DTX issue (i.e., transmitter UE cannot recognize the case that a receiver UE misses PSCCH scheduling PSSCH)
Issues when multiple receiver UEs transmit HARQ-NACK on the same resource
How to determine the presence of HARQ-NACK transmissions from receiver UEs
Whether/how to handle destructive channel sum effect of HARQ-NACK transmissions from multiple receiver UEs if the same signal is used
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:
Whether to introduce an additional criterion in deciding HARQ-ACK/NACK transmission
How to determine the PSFCH resource used by each receiver UE
FFS whether to support SL HARQ feedback per CBG
Other options are not precluded Agreements:
It is supported to enable and disable SL HARQ feedback in unicast and groupcast.
FFS when HARQfeedback is enabled and disabled.

Agreements:
Study further whether to support UE sending to gNB information which may trigger scheduling retransmission resource in mode 1. FFS including
Which information to send
Which UE to send to gNB
Which channel to use
Which resource to use In the 3GPP RAN1 #96bis meeting (as captured in the 3GPP RAN1 #96bis meeting report), it is further discussed whether receiver UEs in a same group share a PSFCH (Physical Sidelink Feedback Channel) or use a separate PSFCH for HARQ ACK (Hybrid Automatic Repeat Request Acknowledgement)/NACK (Negative Acknowledgement) associated with groupcast transmission as follows:

Agreements:
In HARQ feedback for groupcast,
When Option 1 is used for a groupcast transmission, it is supported
all the receiver UEs share a PSFCH
FFS: a subset of the receiver UEs share a PSFCH
FFS: all or a subset of receiver UEs share a pool of PSFCH.
When Option 2 is used for a groupcast transmission, it is supported
each receiver UE uses a separate PSFCH for HARQ ACK/NACK.
FFS: all or a subset of receiver UEs share a PSFCH for ACK transmission and another PSFCH for NACK transmission
FFS on which entity and how to allocate PSFCH resource to the receiver UE(s)
FFS whether or not to additionally support a mixture of option 1 and option 2 for a groupcast transmission
Note: Each PSFCH is mapped to a time, frequency, and code resource.

In the 3GPP RAN1 #97 meeting (as captured in the 3GPP RAN1 #97 meeting report), it was agreed that an implicit mechanism as follows:

Agreements:
At least for the case when the PSFCH in a slot is in response to a single PSSCH:
Implicit mechanism is used to determine at least frequency and/or code domain resource of PSFCH, within a configured resource pool. At least the following parameters are used in the implicit mechanism:

Slot index (FFS details) associated with PSCCH/PSSCH/PSFCH

Sub-channel(s) (FFS details) associated with PSCCH/PSSCH

Identifier (FFS details) to distinguish each RX UE in a group for Option 2 groupcast HARQ feedback FFS detailed applicability of the above parameters FFS: Other parameters (e.g. SL-RSRP/SINR, Layer-1 source ID, location information, etc.)

In the 3GPP RAN2 #105 meeting (as captured in the 3GPP RAN2 #105 meeting report), it was discussed whether leader vehicle is visible in the AS (Access Stratum) layer as follows:

R2-1901730 Summary Report of [104 #60][NR/V2X] Groupcast (Qualcomm) Qualcomm Incorporated discussion FS_NR_V2X Proposal 4: Whether the design need to support platoon leader being visible in AS layer depends on RAN1 progress We need to wait for RAN1 progress/decision on the resource allocation mechanism first.

In the 3GPP RAN2 #106 meeting (as captured in 3GPP R2-1906427), several solutions were discussed regarding feedback resource allocation for groupcast (option 2) as follows:

OPTION 2:

For the case of option 2, the situation is a bit tricky since both ACKs and NACKs can be transmitted and each RX UE may need to be allocated a separate ACK/NACK resource. In other words, we can view the PSFCH transmissions for UE within the group as multiple unicast feedbacks to be multiplexed. In this case, we can consider the following three alternatives:

1) The TX UE has to allocate specific resources based on unique group-wide identifiers for the intended recipients for its data transmission in order to determine whether or not the TB(s) is/are successfully decoded. This requires some indication from the upper layers regarding at least the destination L2 IDs for other members of the group.

2) Another alternative is for the group leader to assume the responsibility of managing HARQ related ID allocation for the entire group. Since the target use case is platooning, we assume that the group leader is already known to the group members and is not expected to change very dynamically.

3) A final option can be to consider the gNB as the AS layer entity responsible for performing the mapping between L2 Destination ID and HARQ identifier. However, in our view, this option is relevant for the case when in connected mode and the group leader might have to assume this responsibility otherwise in any case.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

According to the RAN1 #95 agreement (as captured in the 3GPP RAN1 #95 meeting report), two options for a Receiver UE (Rx) UE to transmit HARQ feedback to a Transmitter UE (Tx UE) in groupcast were introduced:

Option 1: A Receiver UE transmits HARQ-NACK on a PSFCH if it fails to decode a corresponding TB after decoding an associated PSCCH. It transmits no signal on the PSFCH otherwise.

Option 2: A Receiver UE transmits HARQ-ACK on a PSFCH if it successfully decodes a corresponding TB. It transmits HARQ-NACK on a PSFCH if it does not successfully decode a corresponding TB after decoding an associated PSCCH which targets the receiver UE.

Issue: Procedure(s) Regarding a Receiver UE Obtaining Information for Determining Feedback Resource(s) (for the Receiver UE) for Groupcast is Unknown.

According to the RAN1 #97 meeting discussion, an implicit mechanism has been introduced for a Rx UE to determine at least frequency and/or code domain resource(s) of PSFCH in response to a PSSCH (Physical Sidelink Shared Channel). The implicit mechanism comprises using an identifier to distinguish each Rx UE in a group for Option 2 groupcast HARQ feedback mentioned above. In other words, a Rx UE could determine frequency and/or code domain resource(s) at least based on an identifier associated with the Rx UE. The value of the identifier associated with the Rx UE is different with other Rx UEs in the group. The present invention discusses possible solutions for Rx UEs to determine identifiers associated with sidelink feedback resource(s).

Solution 1: The UE could Determine Sidelink Feedback Resource(s) Based on Information Provided by an Upper Layer (of the UE).

One general concept of the present invention is that a UE could determine sidelink feedback resource(s) (by the UE itself) based on information provided by an upper layer (of the UE). The sidelink feedback resource(s) could be used to transmit sidelink HARQ feedback associated with or in response to at least one groupcast transmission.

In one embodiment, the UE could derive an identifier based on the information provided by the upper layer (of the UE). The identifier could be associated with the sidelink feedback resource(s). The identifier could be associated with a PSFCH used to transmit sidelink HARQ feedback associated with at least one groupcast transmission. The identifier could be associated with frequency and/or code domain resource(s) of a PSFCH. Additionally or alternatively, the identifier could be associated with slot(s) of a PSFCH. Additionally or alternatively, the identifier could be associated with a (part of) PSFCH.

Additionally or alternatively, the UE could obtain the identifier from the upper layer (of the UE). The identifier could be contained in the information. The information provided by the upper layer could contain group identifier information, Application-layer V2X Group identifier, source layer-2 ID, and/or destination layer-2 ID.

In one example, the UE could determine the value of the identifier at least based on source layer-2 ID provided by the upper layer. The UE could determine the value of the identifier at least based on one or more digits of the source layer-2 ID. In another example, the UE could determine the value of the identifier at least based on one or more digits of the destination layer-2 ID. In an additional example, the UE could determine the value of the identifier at least based on one or more digits of the Application-layer V2X Group identifier.

Figure 9:
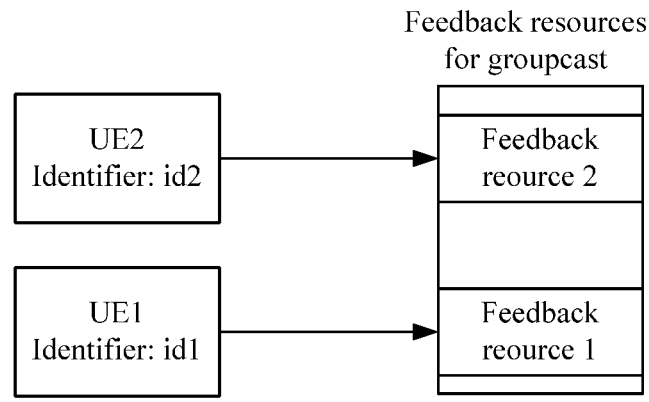
FIG. 9 is a diagram according to one exemplary embodiment.

An example is shown in FIG. 9. In particular, FIG. 9 shows UEs determining feedback resources for groupcast based on identifiers. An upper layer of a first UE (UE 1) provides an identifier (member ID in the group, id1) to (a lower layer of) the first UE, and an upper layer of a second UE (UE 2) provides an identifier (member ID in the group, id2) to (a lower layer of) the second UE. When a groupcast transmission is received by the first and the second UE. The UEs (first UE and second UE) could determine the frequency and/or code domain location of feedback resource(s) at least based on the identifiers provided by their upper layer. Each identifier could map to one feedback resource. The UE with identifier id1 could use feedback resource 1 for HARQ feedback transmission, and the UE with identifier id2 could use feedback resource 2 for HARQ feedback transmission.

The groupcast transmission could be associated with feedback resources for which each member in the group cannot be associated with one feedback resource. In other words, number of the feedback resources could be less than number of UEs in the group. This alternative may not be suitable for this situation. Alternatively, the groupcast transmission could be associated with feedback resources for which at least each member in the group can be associated with one feedback resource.

Figure 10:
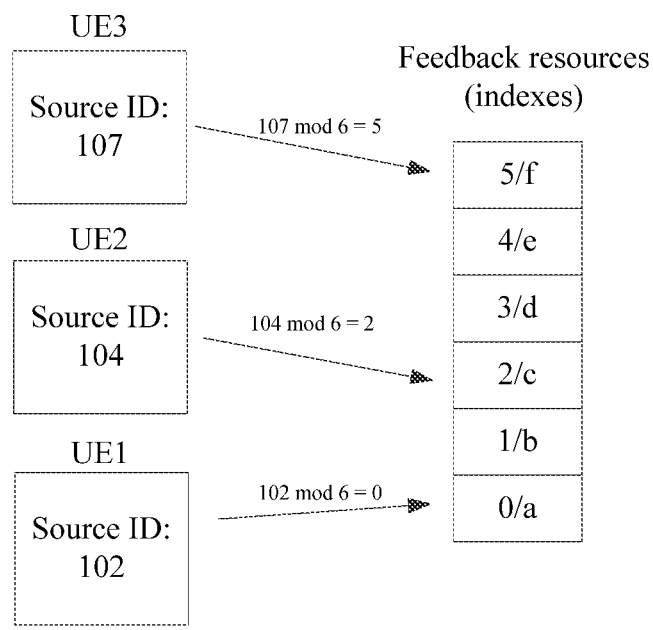
FIG. 10 is a diagram according to one exemplary embodiment.

An example is shown in FIG. 10. In particular, FIG. 10 shows UEs using their identifier (source layer-2 ID) to determine sidelink feedback resources. Three UEs (UE1, UE2, UE3) performs groupcast communication in a group. In response to receiving a groupcast transmission, each of the UEs determines feedback resource(s) associated with the groupcast transmission at least based on slot, frequency information of the groupcast transmission and its identifier (e.g. source Layer-2 ID, member ID in the group or etc.). The groupcast transmission is associated with a total of 6 feedback resources (each feedback resource associated with each parameter a to fin FIG. 10). Additionally or alternatively, each feedback resource could be associated with an index (e.g. 0 to 5 in FIG. 10). Each of the UEs could determine which feedback resource to use for transmitting HARQ feedback based on the remainder of its identifier (e.g. source Layer-2 ID, member ID in the group or etc.) when divided by the number of the feedback resources. UE1 calculates the remainder of its source Layer-2 ID (i.e. remainder of 102 when divided by 6) and use the feedback resource associated with the an index of the same value as the remainder, which is feedback resource with index 0 in FIG. 10.

In another example, a UE could determine its feedback resource associated with a groupcast transmission in a group at least based on an order associated with identifiers (e.g. source layer-2 ID) of one or more than one UEs in the group. In one embodiment, the UE could receive source layer-2 ID(s) of other UEs in the group from its upper layer. The UE could determine a feedback resource to transmit HARQ feedback associated with a groupcast transmission among one or more than one feedback resource(s) (at a timing) based on a position of the value of its identifier among values of identifiers of one or more than one UEs in the group. The identifiers of the UEs in the group could be sorted (in increasing order or in decreasing order), and each identifier of the sorted identifiers could be associated with one of the feedback resources in sequence.

Figure 11:
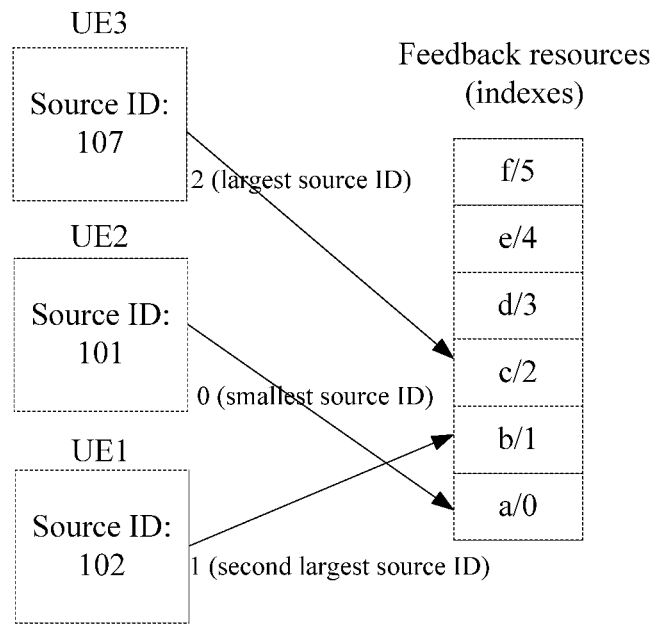
FIG. 11 is a diagram according to one exemplary embodiment.

An illustration of the example is in FIG. 11. In particular, FIG. 11 shows UEs determining feedback resources based on value of source ID(s). As shown in FIG. 11, there are three UEs performing groupcast communication (UE1, UE2, and UE3) in a group. The UEs knows its identifier (e.g. source layer-2 ID or member ID) and identifiers of (all) other UEs in the group. When receiving a groupcast transmission, the UEs associate six feedback resources (feedback resource from a to fin FIG. 11) with the groupcast transmission (e.g. the feedback resources are in a slot and/or frequency associated with the groupcast transmission).

Additionally or alternatively, each of the feedback resources could be associated with an index (e.g. feedback resource a could be associated with index 0). Each of the UEs determines which feedback resource among the six feedback resources to use at least based on the position of the value of its identifier comparing with identifiers of the other UEs in the group. UE1 has an identifier with a $2^{nd}$ lowest value (i.e. 102) in the group, UE1 could determine to use the feedback resource with $2^{nd}$ lowest frequency value among the feedback resources (e.g. feedback resource b).

Additionally or alternatively, UE1 could determine to use the feedback resource associated with the $2^{nd}$ smallest index (e.g. the feedback resource b). Additionally or alternatively UE2 has an identifier with smallest value (i.e. 101) in the group, so UE2 determines to use the feedback resource with the smallest index (the feedback resource with index 0). Additionally or alternatively, UE2 could determine to use the feedback resource with the lowest frequency value among the feedback resources (e.g. feedback resource a). UE3 has an identifier with a $3^{rd}$ lowest value (i.e. 107), so UE 3 determines to use the feedback resource with the $3^{rd}$ smallest index (the feedback resource with index 2). Additionally or alternatively, UE3 could determine to use the feedback resource with the $3^{rd}$ lowest frequency value among the feedback resources.

Figure 12:
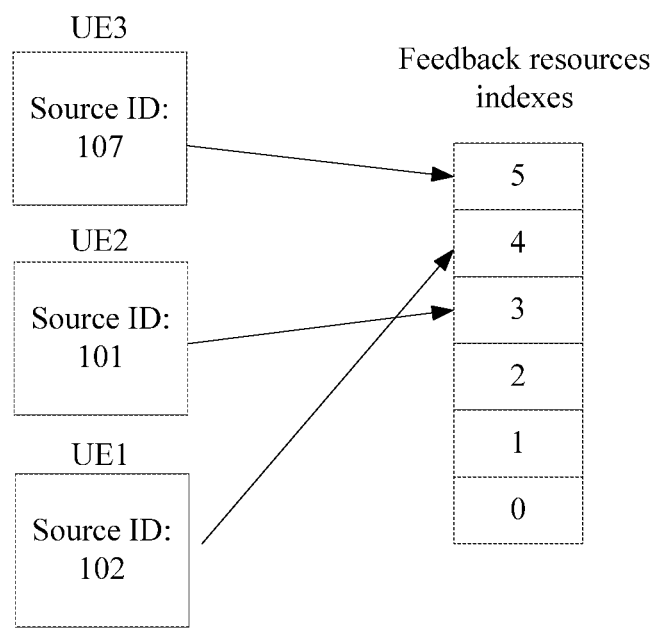
FIG. 12 is a diagram according to one exemplary embodiment.

Additionally or alternatively, as illustrated in FIG. 12, UE3 could select a feedback resource associated with the highest index (i.e. index 5) or the feedback resource with highest frequency value among the feedback resources since UE3 has the highest value of identifier among all the UEs in the group. Additionally or alternatively, UE2 could select a feedback resource associated with the $2^{nd}$ highest index (i.e. index 4) or the feedback resource with $2^{nd}$ highest frequency value among the feedback resources since UE2 has the $2^{nd}$ highest value of identifier among all the UEs in the group. Additionally or alternatively, UE1 could select a feedback resource associated with the $3^{rd}$ highest index (i.e. index 3) or the feedback resource with $3^{rd}$ highest frequency value among the feedback resources since UE1 has the $3^{rd}$ highest value of identifier among all the UEs in the group.

In another example, information provided by the upper layer could include frequency and/or code domain resource(s) of a PSFCH, and the UE could use the frequency and/or code domain resource(s) for transmitting HARQ feedback associated with or in response to a groupcast transmission.

Solution 2: A Leader UE of a Group Provides Information about Association Between Sidelink Feedback Resource(s) and UE(s) to the Group.

The general concept is that a leader UE in a group (or a platoon) of UEs could provide information associated with sidelink feedback resource(s) to one or more UEs in the group. The one or more UEs in the group could determine sidelink feedback resource(s) associated with groupcast transmission transmitted from other UEs in the group at least based on the information provided by the leader UE. Additionally or alternatively, the one or more UEs in the group could determine sidelink feedback resource(s) associated with groupcast transmission transmitted from other UEs in the group at least based on an identifier (e.g., source layer-2 ID, member ID in the group or etc.) associated with the one or more UEs.

The information could contain a list of the association between sidelink feedback resource(s) and UE(s). Each entry of the list could contain an identifier of a UE and an identifier used to identify a sidelink feedback resource for the UE.

The information could contain a first identifier group associated with the one or more UEs. In one embodiment, each of the one or more UEs could be associated with an identifier in the first identifiers group. Each identifier in the first group may have a value different from the values of the other identifiers in the first identifier group.

The information could contain a second identifier group associated with the one or more UEs. The one or more UEs could determine sidelink feedback resource(s) associated with groupcast communications at least based on the second group of identifiers.

The information could contain a mapping between the identifiers in the first group and the identifiers in the second group. Additionally or alternatively, the information could contain a mapping between each of the one or more UEs and one or more sidelink feedback resource(s) associated with groupcast communications.

The information could contain information associated with the leader UE (e.g. mapping between UE and sidelink feedback resource or identifier(s) of the leader UE).

Additionally or alternatively, the information may not contain information associated with the leader UE. As an example, a message transmitted by a leader UE in a group may contain information associated with one or more feedback resources. The one or more feedback resources could be associated with one or more groupcast transmissions, one or more transmitter UEs, and/or one or more receiver UEs.

The information could contain a mapping between the one or more receiver UEs and the one or more feedback resources. Additionally or alternatively, the information could contain a mapping between the one or more transmitter UEs and the one or more feedback resources.

FIG. 13 shows an exemplary message in accordance with one embodiment. As shown in FIG. 13, each identifier in a first identifier group could be associated with a UE in the group (e.g., UEID 1 is associated with UE1, UEID 2 is associated with UE2, and UEID 3 is associated with UE3). Each identifier in a second identifier group could be associated with a feedback resource of the one or more feedback resources (e.g. identifier_1, identifier_2, and identifier_3 are associated with different feedback resources in the one or more feedback resources). In the example, UE1 could determine a feedback resource to transmit HARQ feedback to a transmitter UE in response to a groupcast transmission transmitted by the transmitter UE at least based on identifier_1 in the information. The transmitter UE could be the leader UE, UE2, or UE3. Preferably, UE1 uses a same identifier in the second identifier group (e.g., identifier_1) for all transmitter UEs to determine feedback resources to transmit HARQ feedbacks in response to groupcast transmissions from the all transmitter UEs.

Additionally or alternatively, as shown in FIG. 14A and FIG. 14B, the message transmitted by the leader UE in the group contains information associated with one or more feedback resources. The message contains a mapping between transmitter UEs and identifiers associated with feedback resources for each receiver UE in the group. A receiver UE could determine a feedback resource for transmitting a HARQ feedback to a transmitter UE in response to a groupcast transmission from the transmitter UE at least based on the transmitter UE and the mapping for the receiver UE.

In an example associated with FIG. 14A, when the (RX) UE1 receives a groupcast transmission from the (TX) UE2, the (RX) UE1 uses Identifier1 to determine a feedback resource from the one or more feedback resources to transmit a HARQ feedback to the (TX) UE2. Additionally or alternatively, when the (RX) UE1 receives a groupcast transmission from the (TX) UE3, the (RX) UE1 uses Identifier2 to determine a feedback resource from the one or more feedback resources to transmit a HARQ feedback to the (TX) UE3.

In another example associated with FIG. 14B, when the (RX) UE1 receives a groupcast transmission from the (TX) UE2, the (RX) UE1 uses Identifier3 to determine a feedback resource from the one or more feedback resources to transmit a HARQ feedback to the (TX) UE2. Additionally or alternatively, when the (RX) UE1 receives a groupcast transmission from the (TX) UE3, the (RX) UE1 uses Identifier5 to determine a feedback resource from the one or more feedback resources to transmit a HARQ feedback to the (TX) UE3.

Additionally or alternatively, the leader UE could use one or more specific feedback resources to transmit HARQ feedback in response to groupcast transmission for all transmitter UEs. Additionally or alternatively, the leader UE could use a fixed feedback resource to transmit HARQ feedback in response to receiving a groupcast transmission.

The message could be transmitted by the leader UE via groupcast transmission and/or via broadcast transmission. Each identifier in the first identifier group could be source-layer2 ID of the UE associated with each identifier. Each identifier in the second identifier group could be an index associated with a feedback resource in the one or more feedback resources.

Solution 3: A Transmitter UE of a Group Provides Information about Association Between Sidelink Feedback Resource(s) and Receiver UE(s) to the Group.

The general concept is that a transmitter UE in a group could provide information associated with sidelink feedback resource(s) to one or more (receiver) UEs. The information could contain a list of the association between sidelink feedback resource(s) and receiver UE(s). Each entry of the list could contain an identifier of a receiver UE and an identifier used to identify a sidelink feedback resource for the receiver UE. The receiver UE is in view of the transmitter UE sending this information.

The one or more UEs could determine sidelink feedback resource(s) associated with groupcast transmissions transmitted by the transmitter UE at least based on the information provided by the transmitter UE. The one or more UEs may not determine sidelink feedback resource(s) associated with groupcast transmissions transmitted by the transmitter UE based on the information provided by other transmitter UEs. Additionally or alternatively, the one or more UEs could determine sidelink feedback resource(s) associated with groupcast transmission (transmitted by the transmitter UE) at least based on one or more identifiers associated with one or more UEs in the group provided by an upper layer and the information provided by the transmitter UE.

Figure 15:
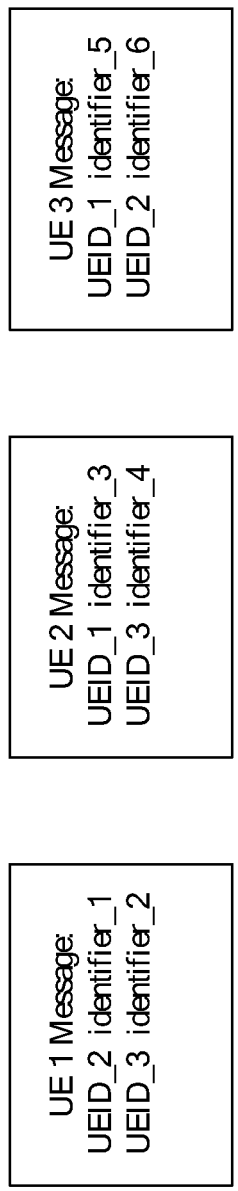
FIG. 15 is a diagram according to one exemplary embodiment.

In an example shown in FIG. 15, there are 3 UEs (i.e. UE1, UE2, and UE3) in a group for groupcast communication. UE1 could transmit a first message (e.g. UE1 Message) associated with sidelink feedback resources to UE2 and UE3. UE1 could perform a groupcast transmission to transmit the first message to one or more UEs. The first message could indicate a source layer-2 ID or a member ID associated with UE1. Additionally or alternatively, UE2 could transmit a second message (e.g. UE2 Message) associated with sidelink feedback resources to UE1 and UE3. UE2 could perform a groupcast transmission to transmit the second message to one or more UEs in the group. The second message could indicate a source layer-2 ID or a member ID associated with UE2. Additionally or alternatively, UE3 could transmit a third message (e.g. UE3 Message) associated with sidelink feedback resources to UE1 and UE2. UE3 could perform a groupcast transmission to transmit the third message to one or more UEs in the group. The third message could indicate a source layer-2 ID or a member ID associated with UE3.

The first message could contain identifiers associated with UE2 and UE3 (e.g. UEID 2 and UEID 3). The identifiers associated with UE2/UE3 could be source layer-2 ID or member ID of UE2/UE3. The first message could contain identifiers associated with feedback resources (e.g. identifier_1 and identifier_2). The first message could contain a mapping between UE2/UE3 and sidelink feedback resource(s). When receiving a groupcast transmission transmitted from UE1, UE2 and UE3 could determine sidelink feedback resource(s) in response to the groupcast transmission based on identifiers_1 and identifier_2, respectively.

The second message could contain identifiers associated with UE1 and UE3 (e.g. UEID_1 and UEID 3). The identifiers associated with UE1/UE3 could be source layer-2 ID or member ID of UE1/UE3. The second message could contain identifiers associated with feedback resources (e.g. identifier_3 and identifier_4). The second message could contain a mapping between UE1/UE3 and sidelink feedback resource(s). When receiving a groupcast transmission transmitted from UE2, UE1 and UE3 could determine sidelink feedback resource(s) in response to the groupcast transmission based on identifiers_3 and identifier_4, respectively.

The third message could contain identifiers associated with UE1 and UE2 (e.g. UEID_1 and UEID 2). The identifiers associated with UE1/UE2 could be source layer-2 ID or member ID of UE1/UE2. The third message could contain identifiers associated with feedback resources (e.g. identifier_5 and identifier_6). The third message could contain a mapping between UE1/UE2 and sidelink feedback resource(s). When receiving a groupcast transmission transmitted from UE3, UE1 and UE2 could determine sidelink feedback resource(s) based on identifier_5 and identifier_6, respectively.

Figure 16:
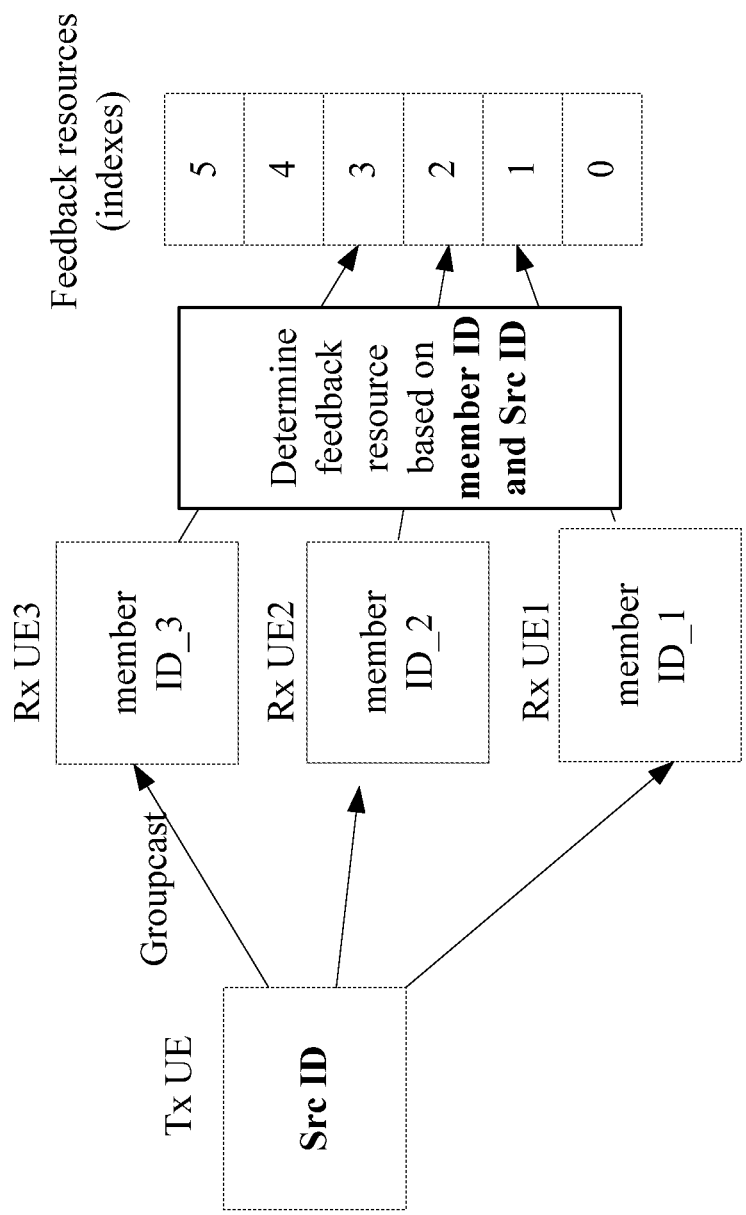
FIG. 16 is a diagram according to one exemplary embodiment.

An example is shown in FIG. 16. A Tx UE performs groupcast communication with 3 Rx UEs (Rx UE1, Rx UE2, and Rx UE3) in a group. Each of the 3 Rx UEs receives (or obtains) a member ID from an upper layer of the Rx UE (e.g. member ID_1 for Rx UE1, member ID_2 for Rx UE2 and member ID_3 for Rx UE3). The member ID could be associated with the group. The value of each member ID is different from other member IDs of other Rx UEs in the group (e.g. the member IDs are used to distinguish Rx UEs in the group). The Rx UE is associated with a ID (Src ID). The ID could be (Layer-1 or Layer-2) source ID of the Tx UE. The ID or part of the ID could be provided by the Tx UE to the Rx UEs (e.g. via groupcast transmissions). The Tx UE could perform groupcast transmission to transmit sidelink data to the 3 Rx UEs. The groupcast transmission may be associated with 6 feedback resources. Each feedback resource is associated with an index. The Rx UEs could determine feedback resource associated with the groupcast transmission at least based on (each) member ID and the ID (Src ID) associated with the Tx UE. For example, the Rx UEs may determine an index among the indexes of the feedback resources (e.g. 0 to 5) based on the (each) member ID and the Src ID. For example, Rx UE1 could determine or derive index number 1 based on member ID_1 and Src ID. The Rx UE1 could then transmit feedback to Tx UE via feedback resource associated with index 1.

The first, second, and/or third message could be a (PC5) RRC message or a MAC control element. The information could be transmitted to the second UE via a (PC5) RRC signaling and/or via unicast message. The information could be transmitted via groupcast and/or broadcast. The information could contain source Layer-2 ID of the Tx UE. The information could be indicative of one or more digits/bits or part of the source Layer-2 ID of the Tx UE.

For all concepts, solutions and examples above:
The upper layer could be a V2X application layer, a V2X layer, a NAS layer of the UE, and/or a protocol stack above physical layer.
The upper layer could be above the AS layer.
The sidelink feedback resource(s) could be a PSFCH or a PSSCH.
The sidelink feedback resource(s) could be frequency and/or code domain resource(s) associated with the identifier.
The identifier could be the source layer-2 ID of a UE or the destination layer-2 ID of a UE.
The identifier could be group identifier information or Application-layer V2X Group identifier.
The group could comprise one or more than one UEs for groupcast communication, or one or more transmitter UEs (Tx UEs) for groupcast transmission.
The transmitter UEs could perform a groupcast transmissions in a group.
The information associated with sidelink feedback resource(s) could be a MAC CE or a (PC5) RRC message.
The information associated with sidelink feedback resource(s) could be used to configure feedback resource(s) for one or more UEs in a group for groupcast communication.
The leader UE may not have RRC unicast connection with the receiver UE(s).
The transmitter UE may not have RRC unicast connection with the receiver UE(s).

Figure 17:
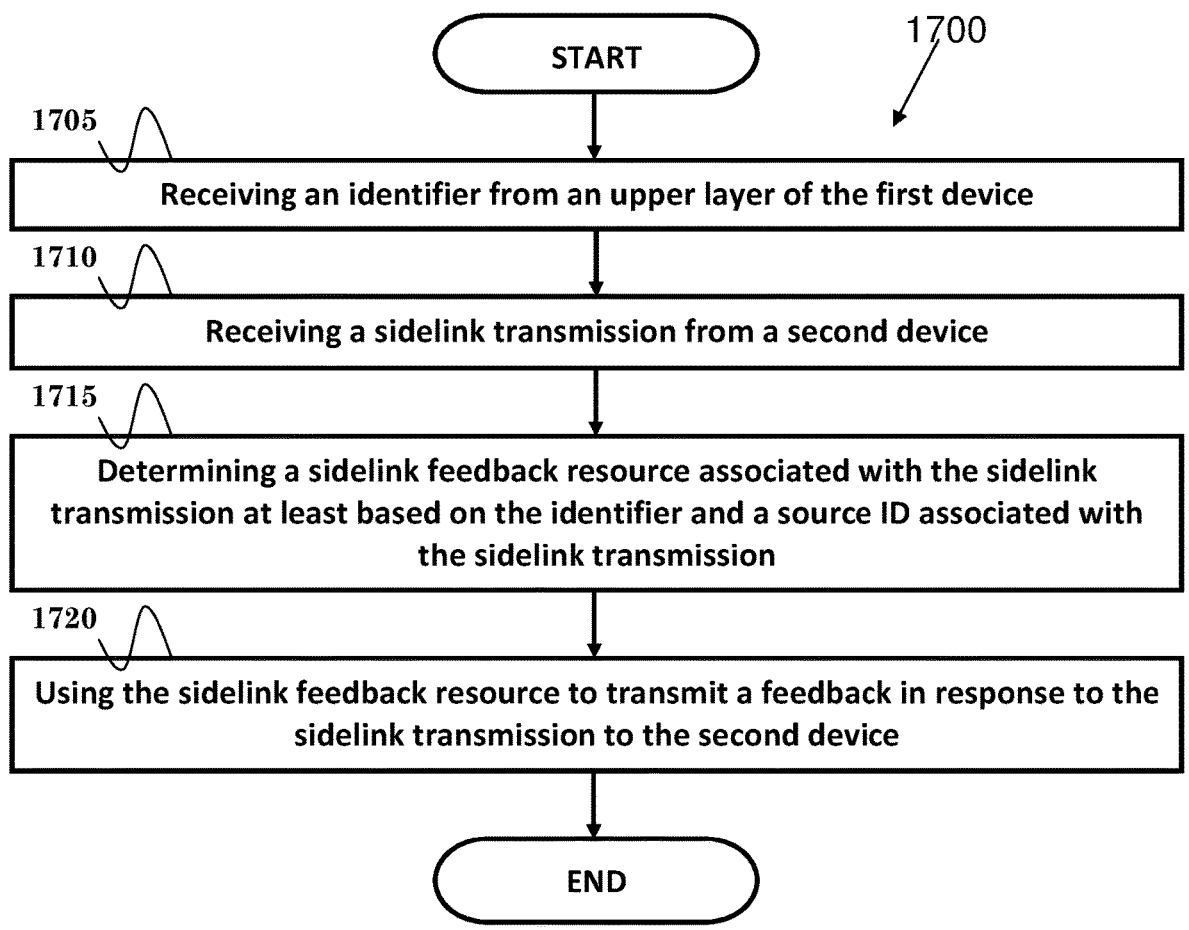
FIG. 17 is a flow chart according to one exemplary embodiment.

FIG. 17 is a flow chart 1700 according to one exemplary embodiment from the perspective of a first device for determining sidelink feedback resource associated with sidelink communication. In step 1705, the first device receives an identifier from an upper layer of the first device. In step 1710, the first device receives a sidelink transmission from a second device. In step 1715, the first device determines a sidelink feedback resource associated with the sidelink transmission at least based on the identifier and a source ID associated with the sidelink transmission. In step 1720, the first device uses the sidelink feedback resource to transmit a feedback in response to the sidelink transmission to the second device.

In one embodiment, the first device could determine the sidelink feedback resource further based on the remainder of the identifier divided by a (total) number of sidelink feedback resources associated with the sidelink transmission. The sidelink feedback resource could be associated with an index, and/or the index associated with the sidelink feedback resource could be equal to and/or associated with the remainder of the identifier divided by a (total) number of sidelink feedback resources associated with the sidelink transmission.

In one embodiment, the upper layer could be V2X application layer of the first device or V2X layer of the first device. The identifier could be member ID of the first device associated with a group, wherein the first device performs the sidelink communication for the group. Each device in the group could be associated with a member ID different from member IDs associated with other devices in the group.

In one embodiment, the source ID could be a part of layer-2 source ID of the second device. The sidelink transmission could be groupcast transmission.

In one embodiment, the first device transmits the feedback as HARQ-ACK on the sidelink feedback resource if the first device successfully decodes the sidelink transmission, and/or the first device transmits the feedback as HARQ-NACK on the sidelink feedback resource if the first device does not successfully decode the sidelink transmission.

Referring back to FIGS. 3 and 4, in one exemplary embodiment of a first device for determining sidelink feedback resource associated with sidelink communication. The first device 300 includes a program code 312 stored in the memory 310. The CPU 308 could execute program code 312 to enable the first device (i) to receive an identifier from an upper layer of the first device, (ii) to receive a sidelink transmission from a second device, (iii) to determine a sidelink feedback resource associated with the sidelink transmission at least based on the identifier and a source ID associated with the sidelink transmission, and (iv) to use the sidelink feedback resource to transmit a feedback in response to the sidelink transmission to the second device. Furthermore, the CPU 308 can execute the program code 312 to perform all of the above-described actions and steps or others described herein.

Figure 18:
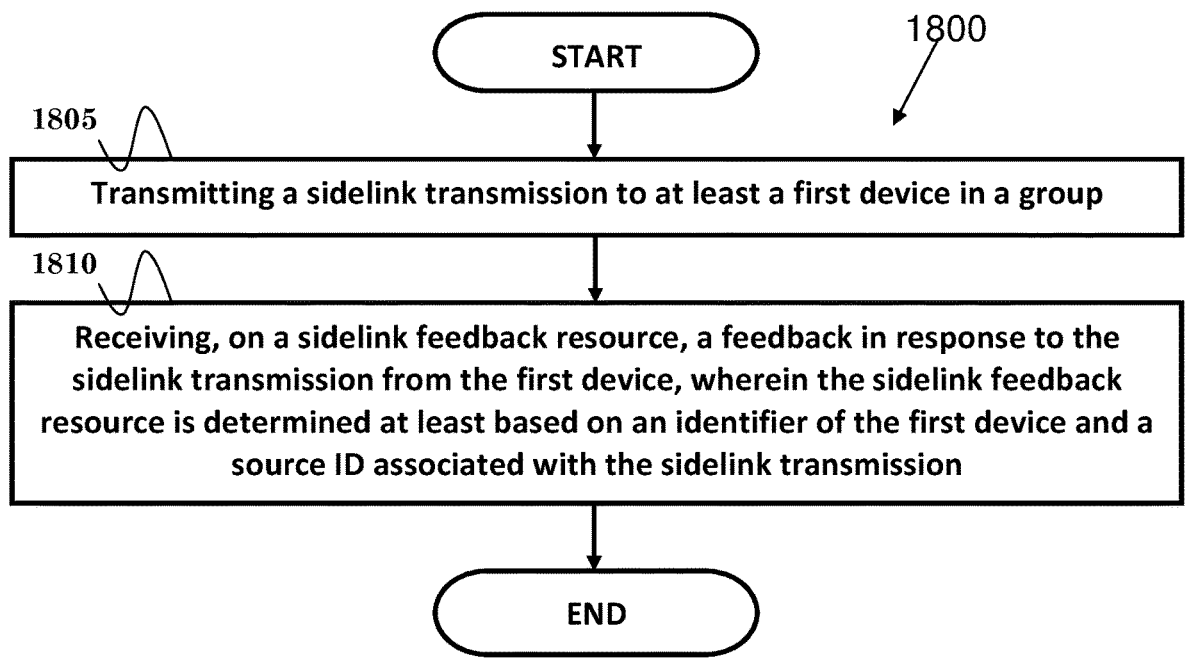
FIG. 18 is a flow chart according to one exemplary embodiment.

FIG. 18 is a flow chart 1800 according to one exemplary embodiment from the perspective of a second device for receiving sidelink feedback(s) associated with sidelink communication. In step 1805, the second device transmits a sidelink transmission to at least a first device in a group. In step 1810, the second device receives, on a sidelink feedback resource, a feedback in response to the sidelink transmission from the first device, wherein the sidelink feedback resource is determined at least based on an identifier of the first device and a source ID associated with the sidelink transmission.

In one embodiment, the sidelink feedback resource could be determined based on the remainder of the identifier divided by a (total) number of sidelink feedback resources associated with the sidelink transmission. The sidelink feedback resource could be associated with an index, and/or the index associated with the sidelink feedback resource could be equal to and/or associated with the remainder of the identifier divided by a (total) number of sidelink feedback resources associated with the sidelink transmission.

In one embodiment, the identifier of the first device could be received from an upper layer of the first device, and/or the upper layer is V2X application layer of the first device or V2X layer of the first device. The identifier could be member ID (Identity) of the first device associated with the group. Each device in the group could be associated with a member ID (Identity) different from member IDs associated with other devices in the group.

In one embodiment, the second device could transmit the sidelink transmission to a plurality of devices in a group. Furthermore, the second device could receive, on a plurality of sidelink feedback resources, a plurality of feedbacks associated with the sidelink transmission from the plurality of devices in the group, wherein each of the plurality of sidelink feedback resources is determined at least based on an identifier of one corresponding device among the plurality of devices and the source ID associated with the sidelink transmission. The identifier of the one corresponding device could be member ID of the one corresponding device associated with the group.

In one embodiment, the source ID could be a part of layer-2 source ID of the second device. The sidelink transmission could be groupcast transmission.

In one embodiment, if the second device could receive the feedback as HARQ-ACK on the sidelink feedback resource, the second device considers the sidelink transmission is successfully decoded by the first device. Furthermore, if the second device receives the feedback as HARQ-NACK on the sidelink feedback resource, the second device could consider the sidelink transmission is not successfully decoded by the first device.

Referring back to FIGS. 3 and 4, in one exemplary embodiment of a second device for receiving sidelink feedback(s) associated with sidelink communication. The second device 300 includes a program code 312 stored in the memory 310. The CPU 308 could execute program code 312 to enable the second device (i) to transmit a sidelink transmission to at least a first device in a group, and (ii) to receive, on a sidelink feedback resource, a feedback in response to the sidelink transmission from the first device, wherein the sidelink feedback resource is determined at least based on an identifier of the first device and a source ID associated with the sidelink transmission. Furthermore, the CPU 308 can execute the program code 312 to perform all of the above-described actions and steps or others described herein.

Figure 19:
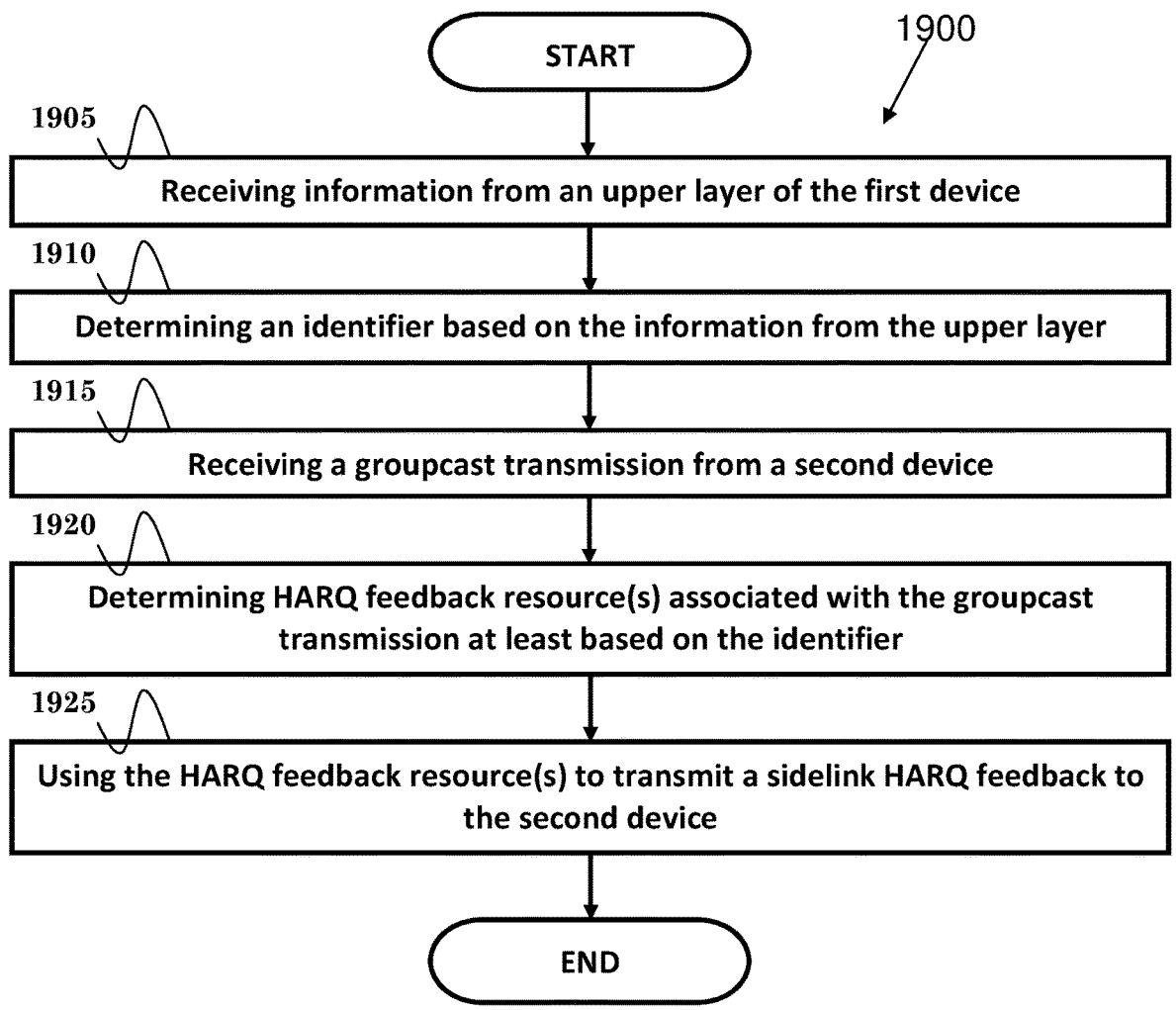
FIG. 19 is a flow chart according to one exemplary embodiment.

FIG. 19 is a flow chart 1900 according to one exemplary embodiment from the perspective of a first device for determining HARQ feedback resource(s) associated with a groupcast transmission. In step 1905, the first device receives information from an upper layer of the first device. In step 1910, the first device determines an identifier based on the information from the upper layer. In step 1915, the first device receives a groupcast transmission from a second device. In step 1920, the first device determines HARQ feedback resource(s) associated with the groupcast transmission at least based on the identifier. In step 1925, the first device uses the HARQ feedback resource(s) to transmit a sidelink HARQ feedback to the second device.

Referring back to FIGS. 3 and 4, in one exemplary embodiment of a first device for determining HARQ feedback resource(s) associated with a groupcast transmission. The first device 300 includes a program code 312 stored in the memory 310. The CPU 308 could execute program code 312 to enable the first device (i) to receive information from an upper layer of the first device, (ii) to determine an identifier based on the information from the upper layer, (iii) to receive a groupcast transmission from a second device, (iv) to determine HARQ feedback resource(s) associated with the groupcast transmission at least based on the identifier, and (v) to use the HARQ feedback resource(s) to transmit a sidelink HARQ feedback to the second device. Furthermore, the CPU 308 can execute the program code 312 to perform all of the above-described actions and steps or others described herein.

Figure 20:
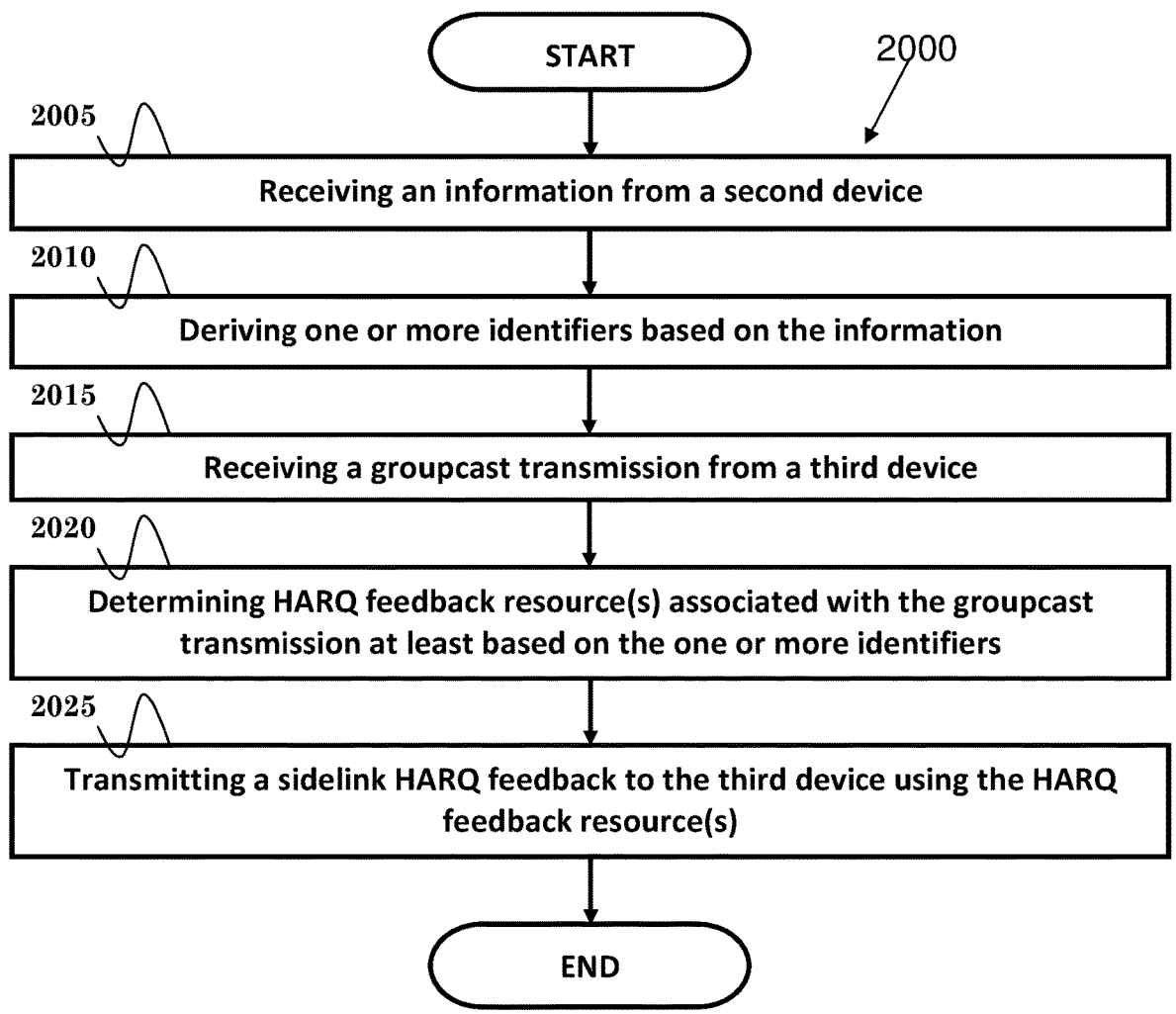
FIG. 20 is a flow chart according to one exemplary embodiment.

FIG. 20 is a flow chart 2000 according to one exemplary embodiment from the perspective of a first device for determining HARQ feedback resource(s) associated with a groupcast transmission. In step 2005, the first device receives an information from a second device. In step 2010, the first device derives one or more identifiers based on the information. In step 2015, the first device receives a groupcast transmission from a third device. In step 2020, the first device determines HARQ feedback resource(s) associated with the groupcast transmission at least based on the one or more identifiers. In step 2025, the first device transmits a sidelink HARQ feedback to the third device using the HARQ feedback resource(s).

Referring back to FIGS. 3 and 4, in one exemplary embodiment of a first device for determining HARQ feedback resource(s) associated with a groupcast transmission. The first device 300 includes a program code 312 stored in the memory 310. The CPU 308 could execute program code 312 to enable the first device (i) to receive an information from a second device, (ii) to derive one or more identifiers based on the information, (iii) to receive a groupcast transmission from a third device, (iv) to determine HARQ feedback resource(s) associated with the groupcast transmission at least based on the one or more identifiers, and (v) to transmit a sidelink HARQ feedback to the third device using the HARQ feedback resource(s). Furthermore, the CPU 308 can execute the program code 312 to perform all of the above-described actions and steps or others described herein.

Figure 21:
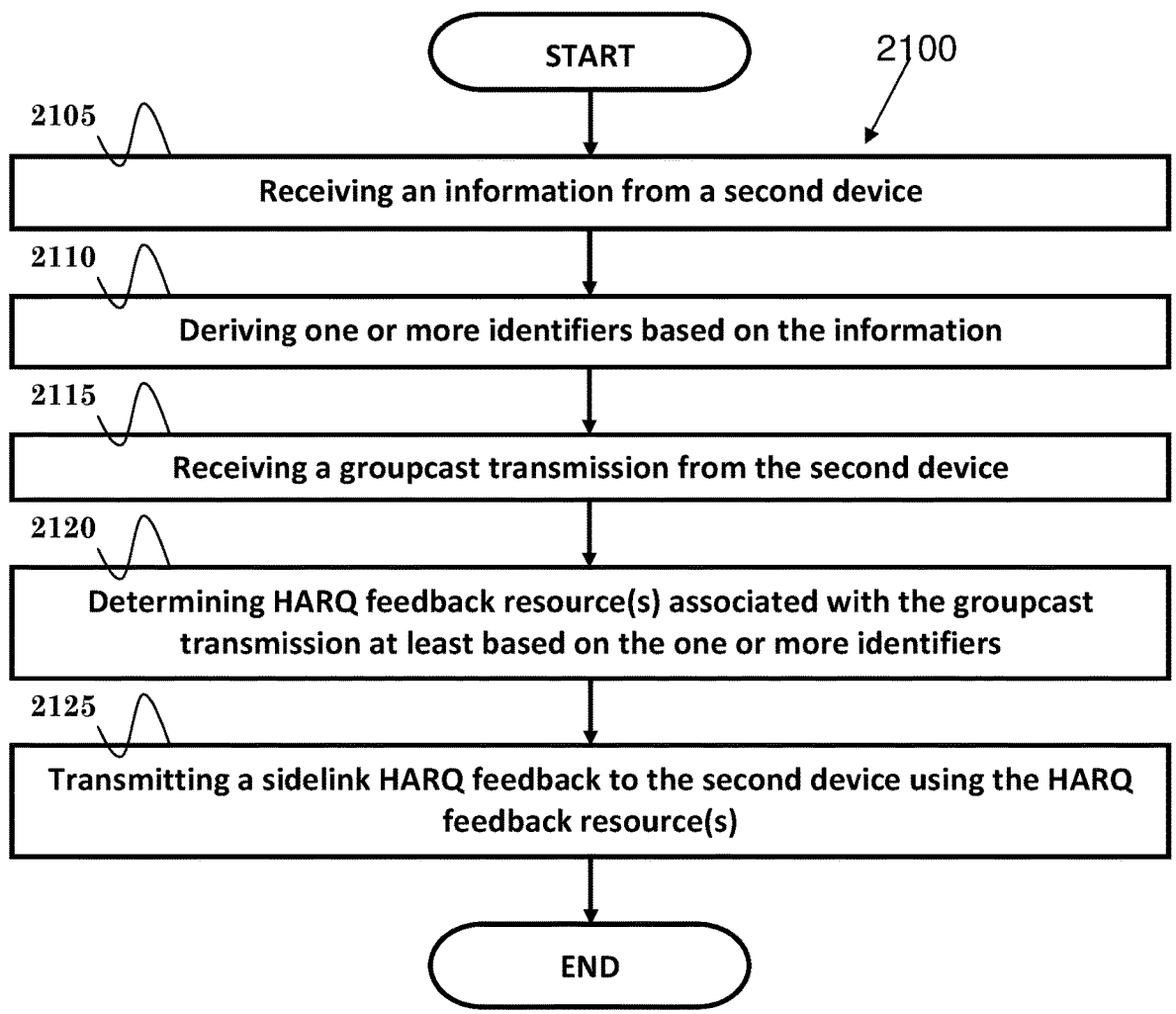
FIG. 21 is a flow chart according to one exemplary embodiment.

FIG. 21 is a flow chart 2100 according to one exemplary embodiment from the perspective of a first device for determining HARQ feedback resource(s) associated with a groupcast transmission. In step 2105, the first device receives an information from a second device. In step 2110, the first device derives one or more identifiers based on the information. In step 2115, the first device receives a groupcast transmission from the second device. In step 2120, the first device determines HARQ feedback resource(s) associated with the groupcast transmission at least based on the one or more identifiers. In step 2125, the first device transmits a sidelink HARQ feedback to the second device using the HARQ feedback resource(s).

Referring back to FIGS. 3 and 4, in one exemplary embodiment of a first device for determining HARQ feedback resource(s) associated with a groupcast transmission. The first device 300 includes a program code 312 stored in the memory 310. The CPU 308 could execute program code 312 to enable the first device (i) to receive an information from a second device, (ii) to derive one or more identifiers based on the information, (iii) to receive a groupcast transmission from the second device, (iv) to determine HARQ feedback resource(s) associated with the groupcast transmission at least based on the one or more identifiers, and (v) to transmit a sidelink HARQ feedback to the second device using the HARQ feedback resource(s). Furthermore, the CPU 308 can execute the program code 312 to perform all of the above-described actions and steps or others described herein.

In the context of embodiments illustrated in FIGS. 19-21 and discussed above, in one embodiment, the first device could receive a TB via the groupcast transmission, wherein the first device determines the HARQ feedback resource(s) further based on a source ID field of the TB (Transport Block). The first device could determine the HARQ feedback resource(s) further based on a source layer-2 ID associated with the first device, the second device, or the third device. The first device could also determine the HARQ feedback resource(s) further based on a timing associated with the receiving of the groupcast transmission. The first device could determine the HARQ feedback resource(s) further based on a frequency (range) associated with the receiving of the groupcast transmission.

In one embodiment, the first device could be a receiver UE (in a group). The second device could be the third device. Alternatively, the second device may not be the third device.

In one embodiment, the second device may be a leader UE (in a group). Alternatively, the second device may not be the leader UE (in a group). The third device could be a transmitter UE (in a group).

In one embodiment, the information could indicate a mapping between one or more devices and HARQ feedback resource(s). The information could also indicate a mapping between one or more devices and one or more identifiers associated with HARQ feedback resource(s). The information may not indicate a mapping between a leader UE (in a group) and HARQ feedback resource(s).

In one embodiment, the first device could transmit the sidelink HARQ feedback on a default HARQ feedback resource if the first device cannot determine the sidelink HARQ feedback resource based on the one or more identifiers.

Figure 22:
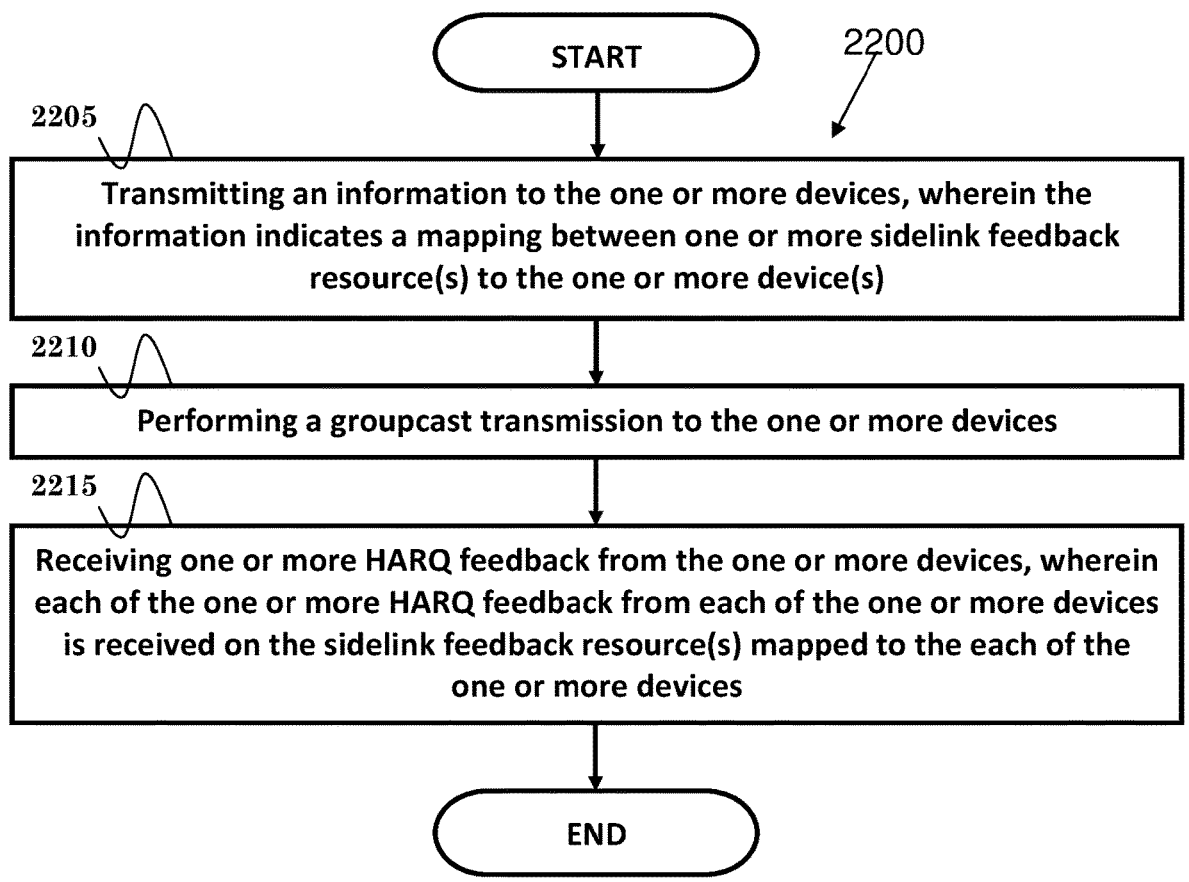
FIG. 22 is a flow chart according to one exemplary embodiment.

FIG. 22 is a flow chart 2200 according to one exemplary embodiment from the perspective of a first device for configuring HARQ feedback resource(s) for one or more devices associated with a groupcast transmission. In step 2205, the first device transmits an information to the one or more devices, wherein the information indicates a mapping between one or more sidelink feedback resource(s) to the one or more device(s). In step 2210, the first device performs a groupcast transmission to the one or more devices. In step 2215, the first device receives one or more HARQ feedback from the one or more devices, wherein each of the one or more HARQ feedback from each of the one or more devices is received on the sidelink feedback resource(s) mapped to the each of the one or more devices.

In one embodiment, the information could indicate a mapping between the one or more sidelink feedback resource(s) and one or more identifiers, wherein each of the one or more identifiers may be associated with each of the one or more device(s). In one embodiment, the information could indicate a mapping between one or more identifiers and the one or more device(s), wherein each of the one or more identifiers may be associated with each of the one or more sidelink feedback resource(s). The information could be transmitted via a RRC (Radio Resource Control) signaling, via broadcast, or via groupcast.

In one embodiment, the information could be a RRC message, a MAC (Medium Access Control) CE (Control Element), or a TB (Transport Block). The information may contain source layer-2 ID (of the first, second, or third device), or destination layer-2 ID (of the first, second, or third device). The information may also contain group identifier information or Application-layer V2X Group identifier.

In one embodiment, the upper layer could be a V2X layer, a V2X application layer, or a layer or protocol stack above MAC, RRC, and AS layer.

Referring back to FIGS. 3 and 4, in one exemplary embodiment of a first device for configuring HARQ feedback resource(s) for one or more devices associated with a groupcast transmission. The first device 300 includes a program code 312 stored in the memory 310. The CPU 308 could execute program code 312 to enable the first device (i) to transmit an information to the one or more devices, wherein the information indicates a mapping between one or more sidelink feedback resource(s) to the one or more device(s), (ii) to perform a groupcast transmission to the one or more devices, and (iii) to receive one or more HARQ feedback from the one or more devices, wherein each of the one or more HARQ feedback from each of the one or more devices is received on the sidelink feedback resource(s) mapped to the each of the one or more devices. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first device to determine sidelink feedback resource associated with sidelink communication, comprising:
   receiving an identifier from an upper layer of the first device;
   receiving a sidelink transmission from a second device;
   determining a sidelink feedback resource associated with the sidelink transmission at least based on the identifier and a source ID (Identity) associated with the sidelink transmission; and
   using the sidelink feedback resource to transmit a feedback in response to the sidelink transmission to the second device,
   wherein the first device transmits the feedback as HARQ-ACK (Hybrid Automatic Repeat Request-Acknowledgement) on the sidelink feedback resource if the first device successfully decodes the sidelink transmission, and/or
   the first device transmits the feedback as HARQ-NACK (Hybrid Automatic Repeat Request-Negative Acknowledgement) on the sidelink feedback resource if the first device does not successfully decode the sidelink transmission.

2. The method of claim 1, wherein the first device determines the sidelink feedback resource further based on the remainder of the identifier divided by a total number of sidelink feedback resources associated with the sidelink transmission.

3. The method of claim 1, wherein the sidelink feedback resource is associated with an index, and/or the index associated with the sidelink feedback resource is equal to and/or associated with the remainder of the identifier divided by a total number of sidelink feedback resources associated with the sidelink transmission.

4. The method of claim 1, wherein the upper layer is V2X (Vehicle-to-Everything) application layer of the first device or V2X layer of the first device.

5. The method of claim 1, wherein the identifier is member ID (Identity) of the first device associated with a group, wherein the first device performs the sidelink communication for the group.

6. The method of claim 5, wherein each device in the group is associated with a member ID different from member IDs associated with other devices in the group.

7. The method of claim 1, wherein the source ID is a part of layer-2 source ID of the second device.

8. The method of claim 1, wherein the sidelink transmission is groupcast transmission.

9. A method for a second device to receive sidelink feedback(s) associated with sidelink communication, comprising:
   transmitting a sidelink transmission to at least a first device in a group; and
   receiving, on a sidelink feedback resource, a feedback associated with the sidelink transmission from the first device, wherein the sidelink feedback resource is determined at least based on an identifier of the first device and a source ID (Identity) associated with the sidelink transmission,
   considering the sidelink transmission is successfully decoded by the first device if the second device receives the feedback as HARQ-ACK (Hybrid Automatic Repeat Request-Acknowledgement) on the sidelink feedback resource, and/or
   considering the sidelink transmission is not successfully decoded by the first device if the second device receives the feedback as HARQ-NACK (Hybrid Automatic Repeat Request-Negative Acknowledgement) on the sidelink feedback resource.

10. The method of claim 9, wherein the sidelink feedback resource is determined based on the remainder of the identifier divided by a total number of sidelink feedback resources associated with the sidelink transmission.

11. The method of claim 9, wherein the sidelink feedback resource is associated with an index, and/or the index associated with the sidelink feedback resource is equal to and/or associated with the remainder of the identifier divided by a total number of sidelink feedback resources associated with the sidelink transmission.

12. The method of claim 9, wherein the identifier of the first device is received from an upper layer of the first device, and/or the upper layer is V2X (Vehicle-to-Everything) application layer of the first device or V2X layer of the first device.

13. The method of claim 9, wherein the identifier is member ID (Identity) of the first device associated with the group.

14. The method of claim 13, wherein each device in the group is associated with a member ID different from member IDs associated with other devices in the group.

15. The method of claim 9, further comprising:
   the second device transmits the sidelink transmission to a plurality of devices in a group; and
   the second device receives, on a plurality of sidelink feedback resources, a plurality of feedbacks associated with the sidelink transmission from the plurality of devices in the group,
   wherein each of the plurality of sidelink feedback resources is determined at least based on an identifier of one corresponding device among the plurality of devices and the source ID associated with the sidelink transmission.

16. The method of claim 15, wherein the identifier of the one corresponding device is member ID of the one corresponding device associated with the group.

17. The method of claim 9, wherein the source ID is a part of layer-2 source ID of the second device.

18. The method of claim 9, wherein the sidelink transmission is groupcast transmission.

* * * * *